(12) United States Patent
Huang et al.

(10) Patent No.: US 8,363,354 B2
(45) Date of Patent: *Jan. 29, 2013

(54) BULK ERASER

(75) Inventors: Lidu Huang, Contra Costa, CA (US);
Fu-Ying Huang, Santa Clara, CA (US)

(73) Assignee: HGST, Netherlands B.V., Amsterdam (NL)

( * ) Notice: Subject to any disclaimer, the term of this patent is extended or adjusted under 35 U.S.C. 154(b) by 818 days.

This patent is subject to a terminal disclaimer.

(21) Appl. No.: 12/337,576

(22) Filed: Dec. 17, 2008

(65) Prior Publication Data
US 2010/0149717 A1 Jun. 17, 2010

(51) Int. Cl.
*G11B 5/127* (2006.01)
(52) U.S. Cl. .................................................. 360/118
(58) Field of Classification Search .................. None
See application file for complete search history.

(56) References Cited

U.S. PATENT DOCUMENTS

| | | | |
|---|---|---|---|
| 5,132,860 A * | 7/1992 | Von Stein | 360/118 |
| 6,594,099 B2 | 7/2003 | Serizawa | |
| 6,714,398 B2 | 3/2004 | Schultz | |
| 7,092,188 B2 | 8/2006 | Price et al. | |
| 2006/0146471 A1* | 7/2006 | Roberts | 361/151 |
| 2007/0247945 A1 | 10/2007 | Yoon | |
| 2007/0247946 A1 | 10/2007 | Yoon | |

* cited by examiner

*Primary Examiner* — David D Davis

(57) ABSTRACT

A bulk eraser for erasing recorded information on a magnetic-recording disk. The bulk eraser includes a plurality of magnets and a structure magnetically coupled with the plurality of magnets to produce magnetic-flux density in a gap. The gap has a first portion, a second portion and a third portion. Two magnets are disposed with opposing polarity across the first portion of the gap. The plurality of magnets and the structure are configured to produce a magnetic-flux density in the second portion of the gap sufficient to erase recorded information from a portion of at least one magnetic-recording disk in a disk-stack of the hard-disk drive when the hard-disk drive is inserted into the second portion of the gap. The plurality of magnets and the structure are configured to direct the magnetic-flux density in a substantially radial direction of the portion of the magnetic-recording disk.

25 Claims, 25 Drawing Sheets

900

```
┌─────────────────────────────────────────────┐
│ PROVIDE A BULK ERASER THAT PRODUCES MAGNETIC-│
│ FLUX DENSITY IN A SECOND PORTION OF A GAP    │
│ SUFFICIENT TO ERASE RECORDED INFORMATION FROM│
│ A PORTION OF THE MAGNETIC-RECORDING DISK, A  │
│ HARD-DISK DRIVE HAVING AN ENCLOSURE, A DISK- │
│ STACK HAVING AT LEAST ONE MAGNETIC-RECORDING │
│ DISK ROTATABLY MOUNTED ON A SPINDLE, AND A   │
│ DRIVE MOTOR HAVING A ROTOR ATTACHED TO THE   │
│ SPINDLE FOR ROTATING THE MAGNETIC-RECORDING  │
│ DISK INSIDE THE ENCLOSURE                    │
│ 910                                          │
└─────────────────────────────────────────────┘
                      │
                      ▼
┌─────────────────────────────────────────────┐
│ CONFIGURE A PLURALITY OF MAGNETS AND A       │
│ STRUCTURE OF THE BULK ERASER SUCH THAT       │
│ MAGNETIC-FLUX DENSITY IS ORIENTED            │
│ SUBSTANTIALLY PARALLEL TO A CENTRAL PLANE IN │
│ THE SECOND PORTION OF THE GAP AND IN A       │
│ SUBSTANTIALLY RADIAL DIRECTION OF THE PORTION│
│ OF THE MAGNETIC-RECORDING DISK WHEN THE      │
│ HARD-DISK DRIVE IS INSERTED INTO THE SECOND  │
│ PORTION OF THE GAP                           │
│ 920                                          │
└─────────────────────────────────────────────┘
                      │
                      ▼
┌─────────────────────────────────────────────┐
│ ROTATE THE MAGNETIC-RECORDING DISK IN THE    │
│ HARD-DISK DRIVE                              │
│ 930                                          │
└─────────────────────────────────────────────┘
                      │
                      ▼
                     (A)
```

```
CONFIGURE POLE PIECES OF THE STRUCTURE AND
POLE-TIP PORTIONS OF THE POLE PIECES SUCH THAT
MAGNETIC-FLUX DENSITY IN THE SECOND PORTION OF
THE GAP IS ORIENTED SUBSTANTIALLY PARALLEL TO
A CENTRAL FLUX-PROPAGATION DIRECTION IN THE
SECOND PORTION OF THE GAP
1010
```

```
ORIENT THE MAGNETIC-RECORDING DISK IN THE
HARD-DISK DRIVE SUCH THAT A RADIAL DIRECTION
OF THE PORTION OF THE MAGNETIC-RECORDING
DISK IS ORIENTED SUBSTANTIALLY PARALLEL TO
THE CENTRAL FLUX-PROPAGATION DIRECTION IN
THE SECOND PORTION OF THE GAP
1020
```

INSERT THE HARD-DISK DRIVE INTO THE SECOND PORTION OF THE GAP WITH AN INSERTION SPEED THAT IS SUFFICIENT TO ASSURE COMPLETE ERASURE OF RECORDED INFORMATION FROM THE PORTION OF THE MAGNETIC-RECORDING DISK IN THE HARD-DISK DRIVE
1110

WHEREIN AN INSERTION SPEED INTO THE GAP IS LESS THAN OR EQUAL TO 1 CENTIMETER PER SECOND
1120

REMOVE THE HARD-DISK DRIVE FROM THE SECOND PORTION OF THE GAP WITH A REMOVAL SPEED THAT IS SUFFICIENT TO ASSURE COMPLETE ERASURE OF RECORDED INFORMATION FROM THE PORTION OF THE MAGNETIC-RECORDING DISK IN THE HARD-DISK DRIVE
1210

↓

WHEREIN THE REMOVAL SPEED FROM THE GAP IS LESS THAN OR EQUAL TO 1 CENTIMETER PER SECOND
1220

```
┌─────────────────────────────────────────────┐
│ ROTATE THE MAGNETIC-RECORDING DISK IN THE   │
│ HARD-DISK DRIVE WITH THE DRIVE MOTOR AT A   │
│ ROTATION SPEED THAT IS SUFFICIENT TO ASSURE │
│ COMPLETE ERASURE OF RECORDED INFORMATION    │
│ FROM THE PORTION OF THE MAGNETIC-RECORDING  │
│ DISK IN THE HARD-DISK DRIVE WITHOUT STALLING│
│             THE DRIVE MOTOR                 │
│                   1310                      │
└─────────────────────────────────────────────┘
                      │
                      ▼
┌─────────────────────────────────────────────┐
│ WHEREIN THE ROTATION SPEED OF THE MAGNETIC- │
│ RECORDING DISK IS LESS THAN OR EQUAL TO 2 HERTZ │
│                   1320                      │
└─────────────────────────────────────────────┘
```

```
┌─────────────────────────────────────────┐
│  PROVIDE THE SECOND PORTION OF THE GAP WITH  │
│  SUFFICIENT CLEARANCE TO ACCOMMODATE THE     │
│  HARD-DISK DRIVE UPON INSERTING AND REMOVING │
│  THE HARD-DISK DRIVE FROM THE SECOND PORTION │
│              OF THE GAP                      │
│                 1510                         │
└─────────────────────────────────────────┘
                    │
                    ▼
┌─────────────────────────────────────────┐
│  WHEREIN THE CLEARANCE OF THE SECOND PORTION │
│  OF THE GAP MAY BE LESS THAN OR EQUAL TO ABOUT│
│              2.6 CENTIMETERS                 │
│                 1520                         │
└─────────────────────────────────────────┘
```

PROVIDE A BULK ERASER THAT PRODUCES MAGNETIC-FLUX DENSITY IN A SECOND PORTION OF A GAP SUFFICIENT TO ERASE A FIRST SERVO PATTERN FROM A PORTION OF THE MAGNETIC-RECORDING DISK, A HARD-DISK DRIVE HAVING AN ENCLOSURE, A DISK-STACK HAVING AT LEAST ONE MAGNETIC-RECORDING DISK ROTATABLY MOUNTED ON A SPINDLE, AND A DRIVE MOTOR HAVING A ROTOR ATTACHED TO THE SPINDLE FOR ROTATION THE MAGNETIC-RECORDING DISK INSIDE THE ENCLOSURE
1810

CONFIGURE A PLURALITY OF MAGNETS AND A STRUCTURE OF THE BULK ERASER SUCH THAT MAGNETIC-FLUX DENSITY IS ORIENTED SUBSTANTIALLY PARALLEL TO A CENTRAL PLANE IN THE SECOND PORTION OF THE GAP AND IN A SUBSTANTIALLY RADIAL DIRECTION OF THE PORTION OF THE MAGNETIC-RECORDING DISK WHEN THE HARD-DISK DRIVE IS INSERTED INTO THE SECOND PORTION OF THE GAP
1820

ROTATE THE MAGNETIC-RECORDING DISK IN THE HARD-DISK DRIVE
1830

BULK ERASER

TECHNICAL FIELD

Embodiments of the present invention relate generally to the field of magnetic-recording, hard-disk drives and methods for manufacturing magnetic-recording, hard-disk drives.

BACKGROUND

The magnetic-recording, hard-disk-drive (HDD) industry is extremely competitive. The demands of the market for ever increasing storage capacity, storage speed, and other enhancement features compounded with the desire for low cost creates tremendous pressure for improved HDDs. Therefore, scientists at the frontiers of magnetic-recording-technology research are driven to improve methods for reducing the cost of manufacturing and are constantly striving to develop new manufacturing tools to effect such cost reductions.

A critical factor affecting the cost of manufacturing is time expended in rework during the manufacturing process. Engineers and scientists engaged in manufacturing research are highly motivated to reduce the time expended in the rework of HDDs, because it goes directly to the profit margin for the product, which can make the difference between success and failure in the marketplace. The challenges of new technologies such as perpendicular-magnetic recording add further complexity to the daunting task of cost reductions. Therefore, the development of methods and tooling by scientists engaged in HDD research that can meet these challenges are crucial to success.

SUMMARY

Embodiments of the present invention include a bulk eraser for erasing recorded information on a magnetic-recording disk. The bulk eraser includes a plurality of magnets and a structure magnetically coupled with the plurality of magnets to produce magnetic-flux density in a gap. The gap has a first portion, a second portion and a third portion. Two magnets are disposed with opposing polarity across the first portion of the gap. The plurality of magnets and the structure are configured to produce a magnetic-flux density in the second portion of the gap sufficient to erase recorded information from a portion of at least one magnetic-recording disk in a disk-stack of the hard-disk drive when the hard-disk drive is inserted into the second portion of the gap. The plurality of magnets and the structure are configured to direct the magnetic-flux density in a substantially radial direction of the portion of the magnetic-recording disk in the hard-disk drive in the second portion of the gap.

DESCRIPTION OF THE DRAWINGS

The accompanying drawings, which are incorporated in and form a part of this specification, illustrate embodiments of the invention and, together with the description, serve to explain the embodiments of the invention:

FIG. 9A is a flow chart illustrating a method of manufacturing of a hard-disk drive using a bulk eraser for erasing recorded information on a magnetic-recording disk, in an embodiment of the present invention.

FIG. 10 is a flow chart illustrating further embodiments of the present invention for a method of manufacturing of a hard-disk drive using a bulk eraser for erasing recorded information on a magnetic-recording disk, in an embodiment of the present invention.

FIG. 11 is a flow chart illustrating further embodiments of the present invention for a method of manufacturing of a hard-disk drive using a bulk eraser for erasing recorded information on a magnetic-recording disk, in an embodiment of the present invention.

FIG. 12 is a flow chart illustrating further embodiments of the present invention for a method of manufacturing of a hard-disk drive using a bulk eraser for erasing recorded information on a magnetic-recording disk, in an embodiment of the present invention.

FIG. 13 is a flow chart illustrating further embodiments of the present invention for a method of manufacturing of a hard-disk drive using a bulk eraser for erasing recorded information on a magnetic-recording disk, in an embodiment of the present invention.

FIG. 15 is a flow chart illustrating further embodiments of the present invention for a method of manufacturing of a hard-disk drive using a bulk eraser for erasing recorded information on a magnetic-recording disk, in an embodiment of the present invention.

FIG. 18A is a flow chart illustrating a method of reworking a hard-disk drive in manufacturing the hard-disk drive using a bulk eraser for erasing a servo pattern on a magnetic-recording disk, in an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Physical Description of Embodiments of the Present Invention for a Bulk Eraser

Figure 1:
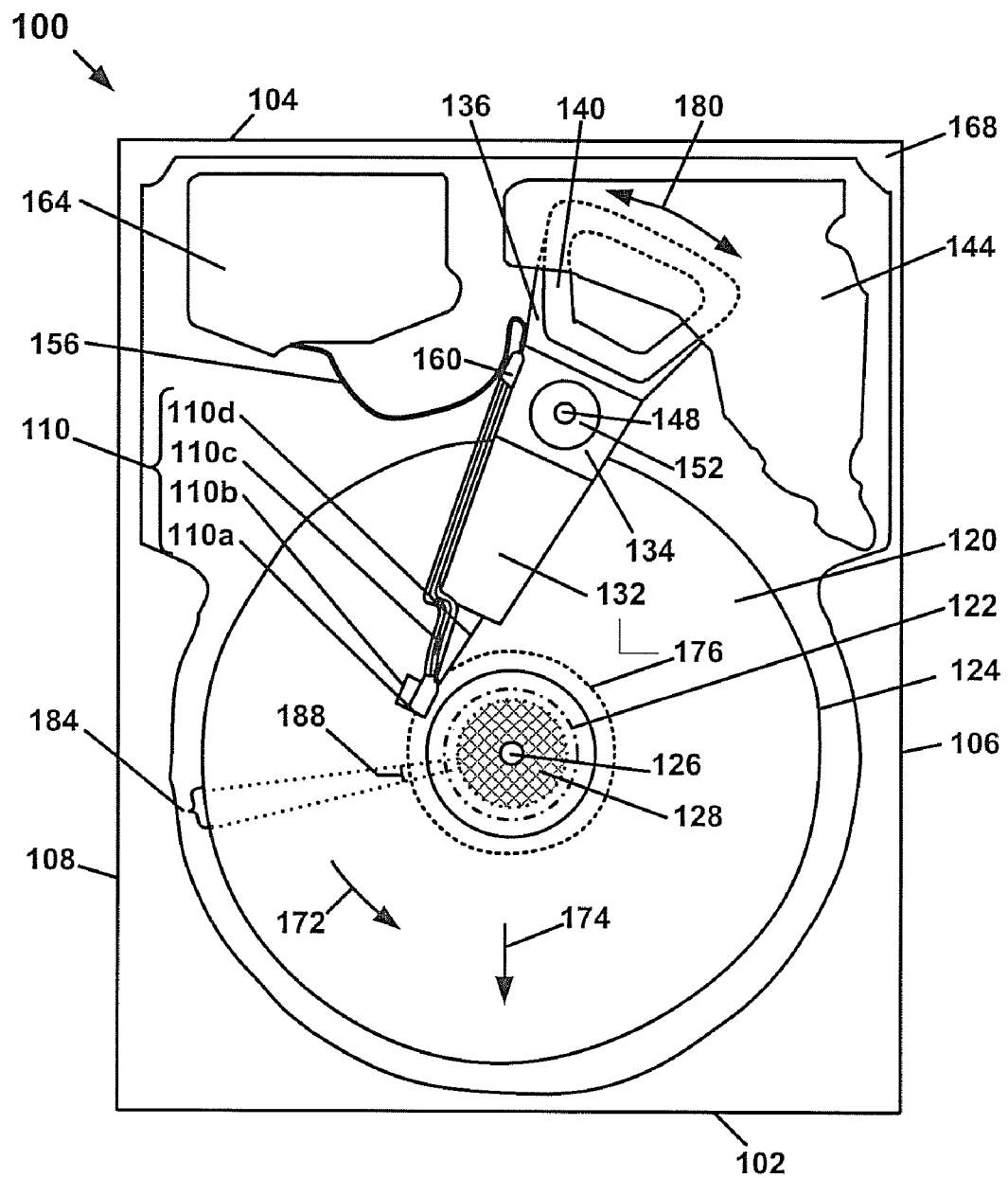
FIG. 1 is plan view of a hard-disk drive (HDD) drive that is manufactured using the bulk eraser for erasing recorded information on a magnetic-recording disk in the HDD, in an embodiment of the present invention.

With reference to FIG. 1, in accordance with an embodiment of the present invention, a plan view of a hard-disk drive (HDD) 100 manufactured with a tool, for example, a bulk eraser, for erasing recorded information from a hard-disk drive is shown. FIG. 1 illustrates the functional arrangement of component parts in HDD 100. The HDD 100 includes at least one HGA 110 including a magnetic-recording head 110a, for example, a perpendicular magnetic recording (PMR) head, a lead suspension 110c attached to the magnetic-recording head 110a, and a load beam 110d attached to a slider 110b, which includes the magnetic-recording head 110a at a distal end of the slider 110b; the slider 110b is attached at the distal end of the load beam 110d to a gimbal portion of the load beam 110d. The HDD 100 also includes at least one magnetic-recording disk 120, for example, a PMR disk, rotatably mounted on a spindle 126 and a drive motor (not shown, but whose location is indicated by the crosshatching at the center of the magnetic-recording disk 120) attached to the spindle 126 for rotating the magnetic-recording disk 120. The magnetic-recording disk includes at least one magnetic layer, which may include a structure including many thin-film layers including a thin-film layer of high coercivity magnetic material; the magnetic layer is deposited on a substrate, but need not be in contact with the substrate, as other layers may be interposed between the substrate and the magnetic layer to provide the magnetic layer with suitable magnetic properties, such as magnetic anisotropy. The substrate may be composed of aluminum, an alloy of aluminum, a ceramic, or glass. The drive motor includes a drive-motor stator and a rotor; the rotor may include one or more drive-motor magnets which cause the rotor to rotate in response to a magnetic field generated by a drive-motor stator including motor windings; alternatively, the drive-motor stator may include one or more drive-motor magnets which cause the rotor to rotate in response to a magnetic field generated by motor windings wound on the rotor. The magnetic-recording head 110a includes a write element, a so-called writer, a read element, a so-called reader, for respectively writing and reading information stored on the magnetic-recording disk 120 of the HDD 100, and a thermal-fly-height-control (TFC) element. The TFC element is configured to position the read element of the magnetic-recording head 110a in communication with the magnetic-recording disk 120 for reading recorded data from the magnetic-recording disk 120. The magnetic-recording disk 120 or a plurality (not shown) of magnetic-recording disks may be affixed to the spindle 126 with a disk clamp 128. If a plurality of magnetic-recording disks is provided, the plurality of magnetic-recording disks along with interposed spacers between the magnetic-recording disks is referred to by the term of art, "disk-stack"; however, as used herein, to simplify the discussion, the term disk-stack will be also used to refer to a single magnetic-recording disk. The magnetic-recording disk 120 also has an outside diameter (OD) 124 and an inside diameter (ID) 122. A radial direction 174 of the magnetic-recording disk 120 is also shown in FIG. 1 that is utilized in aligning the HDD in the bulk eraser for erasing recorded information from the magnetic-recording disk 120. The HDD 100 further includes an arm 132 attached to the HGA 110, a voice-coil motor (VCM) that includes an armature 136 including a voice-coil 140 attached to the arm 132; and a VCM stator 144 including a voice-coil magnet (not shown); the armature 136 of the VCM, which is mounted on a pivot 148 with an interposed pivot bearing 152, is attached to the arm 132 and is configured to move the arm 132 and the HGA 110 to access portions of the magnetic-recording disk 120.

With further reference to FIG. 1, in accordance with an embodiment of the present invention, electrical signals, for example, current to the voice-coil 140 of the VCM, write signal to and read-back signal from the magnetic-recording head 110*a*, are provided by a flexible cable 156. Interconnection between the flexible cable 156 and the magnetic-recording head 110*a* may be provided by an arm-electronics (AE) module 160, which may have an on-board pre-amplifier for the read-back signal, as well as other read-element-channel and write-element-channel electronic components. The flexible cable 156 is coupled to an electrical-connector block 164, which provides electrical communication through electrical feedthroughs (not shown) provided by an HDD housing 168. The HDD housing 168, also referred to as a casting, in conjunction with an HDD cover (not shown, as FIG. 1 shows the HDD 100 with the cover removed) provides an enclosure, which is sealed and protects the information storage components of the HDD 100. The enclosure of the HDD also has: a front side 102, a backside 104, a right side 106 and a left side 108. As shown in FIG. 1, the view shown is onto the topside of the HDD with the cover removed. The bottom side of the HDD is not shown in FIG. 1, but a printed circuit board is mounted on the bottom side which includes electronic components used to control the access to the magnetic-recording disk 120 for writing recorded information to the magnetic-recording disk 120 or reading recorded information from the magnetic-recording disk 120.

With further reference to FIG. 1, in accordance with an embodiment of the present invention, other electronic components (not shown), including as a disk controller and servo-control electronics including a digital-signal processor (DSP), provide electrical signals to the drive motor, the voice-coil 140 of the VCM and the magnetic-recording head 110*a* of the HGA 110. The electrical signal provided to the drive motor enables the drive motor to spin providing a torque to the spindle 126 which is in turn transmitted to the magnetic-recording disk 120 that is affixed to the spindle 126 by the disk clamp 128; as a result, the magnetic-recording disk 120 spins in a direction 172. The spinning magnetic-recording disk 120 creates a cushion of air that acts as an air bearing on which the air-bearing surface (ABS) of the slider 110*b* rides so that the slider 110*b* flies above the surface of the magnetic-recording disk 120 without making contact with a thin magnetic-recording medium of the magnetic-recording disk 120 in which information is recorded. The electrical signal provided to the voice-coil 140 of the VCM enables the magnetic-recording head 110*a* of the HGA 110 to access a data track 176 on which information is recorded. Thus, the armature 136 of the VCM swings through an arc 180, which enables the HGA 110 attached to the armature 136 by the arm 132 to access various data tracks on the magnetic-recording disk 120. Information is stored on the magnetic-recording disk 120 in a plurality of concentric data tracks (not shown) arranged in sectors on the magnetic-recording-head-facing side of the magnetic-recording disk 120, for example, sector 184. Correspondingly, each data track is composed of a plurality of sectored data track portions, for example, sectored data track portion 188. Each sectored data track portion 188 is composed of recorded data and a header containing a servo-burst-signal pattern, for example, an ABCD-servo-burst-signal pattern, information that identifies the data track 176, and error correction code information. In accessing the data track 176, the read element of the magnetic-recording head 110*a* of the HGA 110 reads the servo-burst-signal pattern which provides information to the servo-control electronics, which controls the electrical signal provided to the voice-coil 140 of the VCM, enabling the magnetic-recording head 110*a* to follow the data track 176. Upon finding the data track 176 and identifying a particular sectored data track portion 188, the magnetic-recording head 110*a* either reads data back from the data track 176 or writes data to the data track 176 depending on instructions received by the disk controller from an external agent, for example, a microprocessor of a computer system.

With further reference to FIG. 1, in accordance with an embodiment of the present invention, a plan view of a head-arm-assembly (HAA) is shown. FIG. 1 illustrates the functional arrangement of the HAA with respect to VCM and HGA 110. The HAA includes the HGA 110 and the arm 132. The HAA is attached at the arm 132 to a carriage 134. In the case of an HDD having multiple disks, or platters as disks are sometimes referred to in the art, the carriage 134 is called an "E-block," or comb, because the carriage 134 is arranged to carry a ganged array of arms that gives it the appearance of a comb. As shown in FIG. 1, the armature 136 of the VCM is attached to the carriage 134 and the voice-coil 140 is attached to the armature 136. The AE module 160 may be attached to the carriage 134 as shown. The carriage 134 is mounted on the pivot 148 with the interposed pivot bearing 152, as previously described.

Figure 2A:
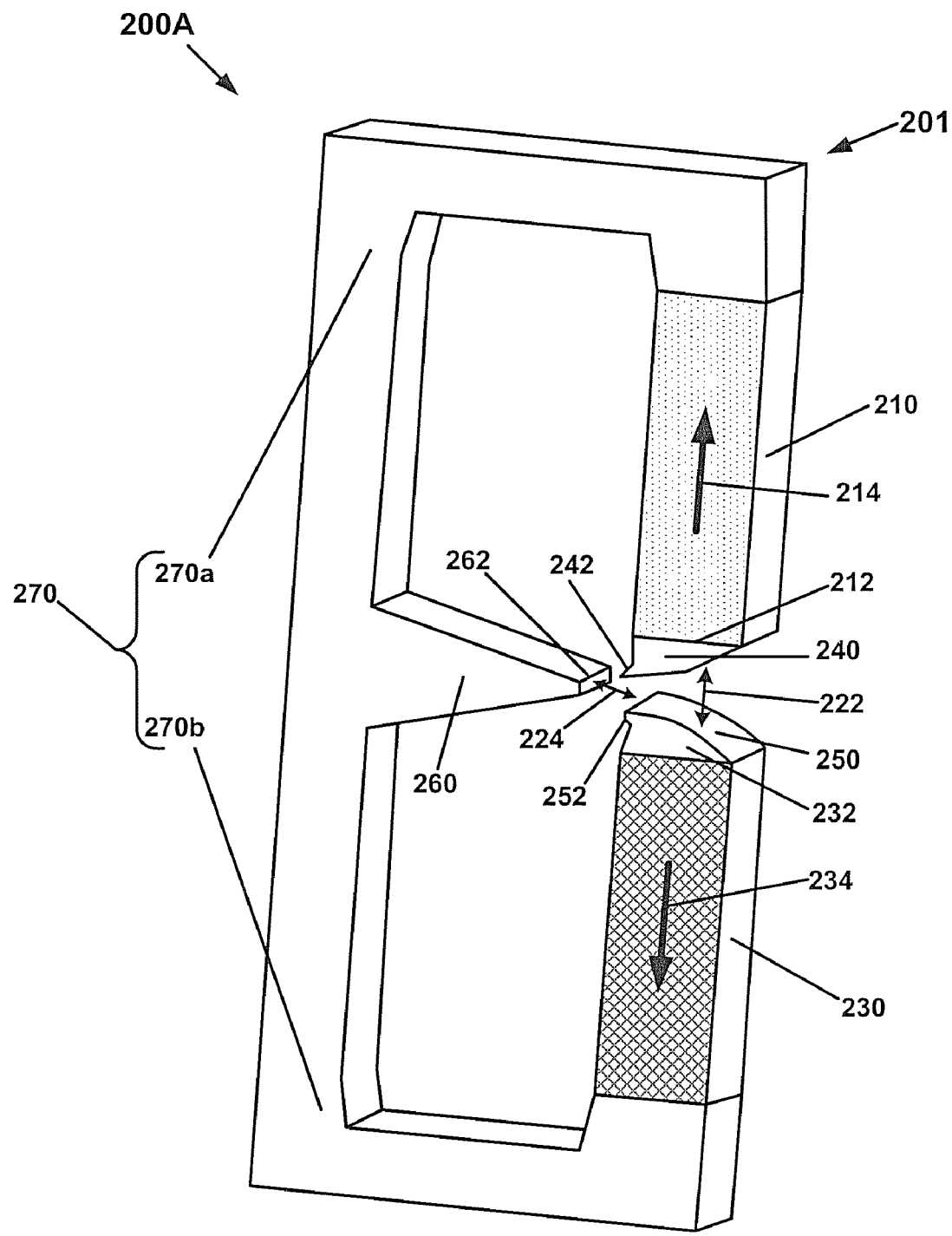
FIG. 2A is a perspective view of a bulk eraser for erasing recorded information on a magnetic-recording disk in a HDD, in an embodiment of the present invention.

With reference now to FIG. 2A, in accordance with an embodiment of the present invention, a perspective view 200A of a bulk eraser 201 for erasing recorded information on a magnetic-recording disk, for example, magnetic-recording disk 120, in a HDD, for example, HDD 100, is shown. The bulk eraser 201 includes a plurality of magnets, for example, a first magnet 210 and a second magnet 230, without limitation thereto, as embodiments of the present invention may include more than two magnets or two sources of magnetic flux. The bulk eraser 201 includes a structure magnetically coupled with the plurality of magnets to produce magnetic-flux density in a gap, wherein the gap has a first portion 222, a second portion 224 and a third portion (not shown, but see description of FIG. 3A-3B). As used herein, it should be recognized that the Gaussian system of units are used, so that a magnetic-flux density, known in the art as a magnetic induction field, or B-field, given in units of Gauss, is equal to a magnetic field intensity, known in the art as a H-field, given in units of Oersteds, if the magnetization, known in the art as a M-field, is negligible. Therefore, it should be understood that when referring to a magnetic-flux density, B-field, in a gap, the magnetic-flux density, B-field, in the gap is equivalent to an associated magnetic field intensity, H-field, in the gap, which is a well-known convention in the art when using Gaussian units. In an embodiment of the present invention, as shown in FIG. 2A, the structure may include: a yoke 270 including a first yoke portion 270*a* and a second yoke portion 270*b*, a first pole piece 240, a second pole piece 250 in the third pole piece 260. Two magnets, first magnet 210 and second magnet 230, are disposed with opposing polarity across the first portion 222 of the gap. The direction 214 of the B-field, the magnetic-flux density, as well as the magnetization field, in the first magnet 210 is shown by the black arrow. The black arrow indicates that a first end pole 212 proximate the first portion 222 of the gap has the polarity of a south pole, and the end pole of the first magnet 210 opposite the south pole has the polarity of a north pole. The black arrow also indicates the direction of magnetic flux propagation through the first magnet 210. Similarly, the direction 234 of the B-field, the magnetic-flux density, as well as the magnetization field, in the second magnet 230 is shown by the white arrow. The white arrow indicates that a second end pole 232 proximate first portion 222 of the gap has the polarity of a south pole, and the end pole of the second magnet 230 opposite the south pole has the polarity of a north pole. The white arrow also indicates the direction of magnetic flux propagation through the second magnet 230. At least one of the plurality of magnets, for example, magnets 210 and 230, may be a high-field-strength, permanent magnet, which may be composed of a material such as neodymium iron boron, NdFeB. The grade of the NdFeB material used for at least one magnet of the plurality of magnets may be a grade between about grade 48 and about grade 54; however, a grade of about grade 50 provides a very stable magnet. The plurality of magnets 210 and 230 and the structure are configured to produce a magnetic-flux density in the second portion 224 of the gap sufficient to erase recorded information from a portion of at least one magnetic-recording disk, for example, magnetic-recording disk 120, in a disk-stack of the HDD when the HDD is inserted into the second portion 224 of the gap. The plurality of magnets 210 and 230 and the structure are configured to direct the magnetic-flux density in a substantially radial direction, for example, radial direction 174, of the portion of the magnetic-recording disk in the HDD in the second portion 224 of the gap. For example, the first pole piece 240 has a first pole-tip portion 242, the second pole piece 250 has a second pole-tip portion 252 and the third pole piece 260 has a third pole-tip portion 262 configured to provide magnetic-flux density in the second portion 224 of the gap with the characteristics described above.

With further reference to FIG. 2A, in accordance with an embodiment of the present invention, the plurality of magnets, for example, magnets 210 and 230, and the structure are configured to produce a magnetic-flux density sufficient to erase recorded information from portions of a plurality of magnetic-recording disks in a disk-stack of the HDD, for example, HDD 100. One type of recorded information that is frequently required to be erased in manufacturing is servo pattern information on the magnetic-recording disk. Occasionally, it is found in the manufacturing process that the servo pattern is corrupted and it becomes necessary to erase the corrupted servo pattern and to write a new servo pattern to replace it. However, erasing the corrupted servo pattern by using the magnetic recording heads can take a substantially long time, tens of minutes. The bulk eraser, for example, bulk eraser 201, can substantially reduce the erase time to tens of seconds. To accomplish this, the HDD with the corrupted servo pattern is inserted into the erase field of the bulk eraser in a type of batch processing procedure, which erases several portions of the magnetic-recording disk simultaneously, which gives rise to the term of art "bulk eraser" to describe the tool for erasing recorded information on a magnetic-recording disk of an HDD. Therefore, the plurality of magnets are configured to produce a magnetic-flux density sufficient to erase recorded information from a portion of at least one magnetic-recording disk containing servo information in a disk-stack of the HDD. Moreover, the bulk eraser can be used outside the scope of manufacturing, for example, to erase recorded information, for example, data recorded by a user, from an HDD used in an in-service environment. Therefore, the plurality of magnets are configured to produce a magnetic-flux density sufficient to erase recorded data from a portion of at least one magnetic-recording disk containing recorded data in a disk-stack of the HDD to preserve security of the recorded data.

With further reference to FIG. 2A, in accordance with an embodiment of the present invention, another particularly useful application of the bulk eraser is for erasing magnetic-recording disks having high coercivity, such as PMR disks. Thus, the plurality of magnets, for example, magnets 210 and 230, and the structure may also be configured to erase recorded information from a magnetic-recording disk that is a PMR disk. Moreover, the plurality of magnets and the structure are configured to produce magnetic-flux density such that magnetic-flux density is applied to a localized portion of the magnetic-recording disk to suppress eddy currents in the magnetic-recording disk of the HDD. This allows for the magnetic-recording disk to be erased more quickly, because eddy currents can stall the drive motor preventing rotation of the magnetic-recording disk during the erasure process.

With further reference to FIG. 2A, in accordance with an embodiment of the present invention, another issue attending the use of the bulk eraser in the manufacturing process is that the erase fields used to erase recorded information on the magnetic-recording disk are fairly high to overcome the coercivity of magnetic recording materials used in the magnetic layer of the magnetic-recording disk. The magnetic moment in the drive-motor magnets can potentially be degraded when using the bulk eraser to erase recorded information on the magnetic-recording disk. Consequently, the magnetic-flux density produced by the plurality of magnets and the structure is configured to erase recorded information from the magnetic-recording disk disposed in the second portion of the gap without degrading the magnetization of a drive-motor magnet in the drive motor disposed in the third portion of the gap. To assure that a large portion of the magnetic-recording disk is erased without degrading the magnetization of the drive-motor magnets, the intensity of a field component of the magnetic-flux density directed along the radial direction in the plane of the magnetic-recording disk produced by the plurality of magnets and the structure has a gradient as a function of distance along the radial direction at a transition region between the second portion of the gap and the third portion of the gap such that the gradient allows erasing recorded information from the magnetic-recording disk in close proximity to the drive-motor magnet in the drive motor without degrading the magnetization of the drive-motor magnet in the drive motor. The high field gradient is also desirable, because it reduces the amount of time to erase portions of the magnetic-recording disk that cannot be reached by the erase field, for which it is necessary to erase with a magnetic recording head; in other words, the more of the magnetic-recording disk that can be erased with the bulk eraser, the less of the magnetic-recording disk will have to be erased by a magnetic recording head, which is a time-consuming process. Consequently, every additional millimeter along the radius of the magnetic-recording disk that can be erased by the erase field can significantly reduce the amount of time expended by erasing the remaining portions of the magnetic-recording disk with the magnetic recording head, which reduces the cost of manufacturing. Therefore, it is desirable to provide a bulk eraser with a strong erase field, magnetic-flux density, over the magnetic-recording disk and a steep gradient in the magnetic-flux density in the proximity to the drive-motor magnet.

Figure 2B:
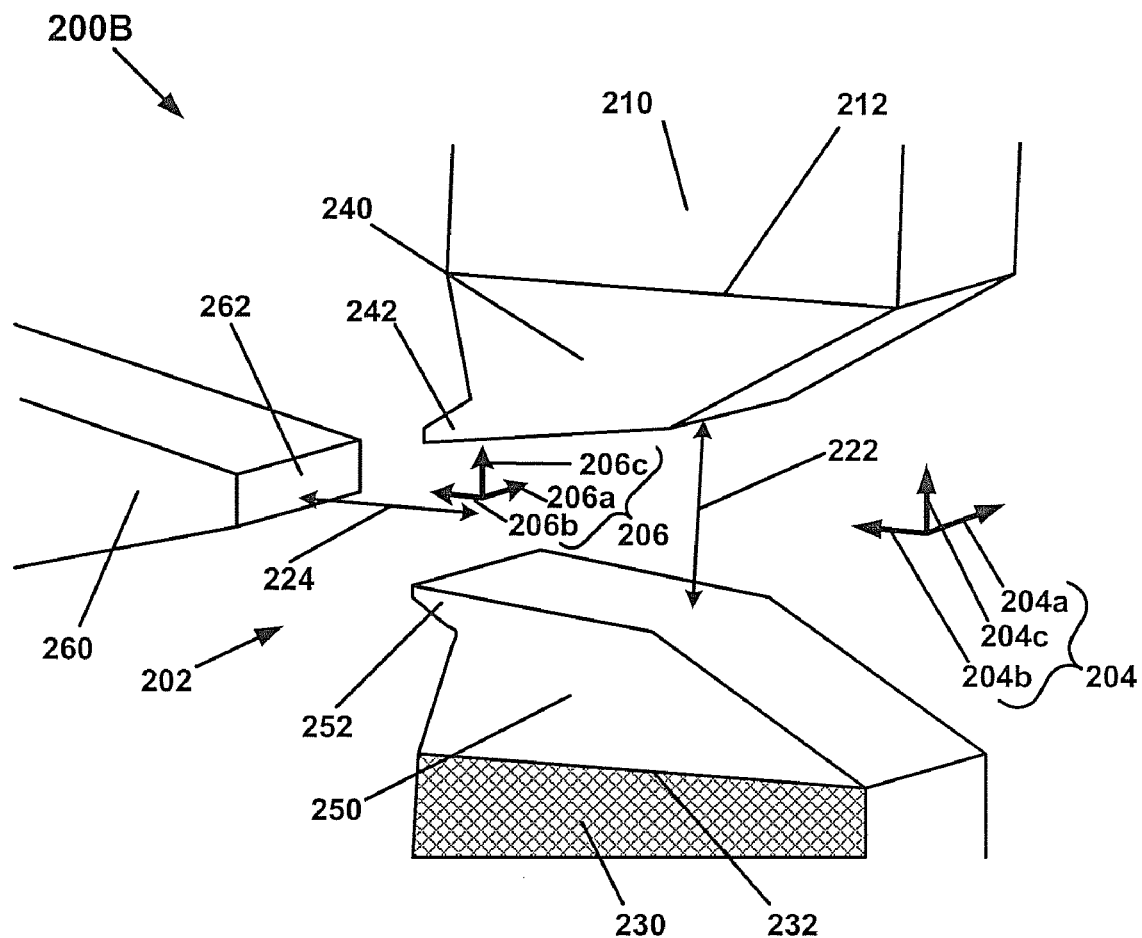
FIG. 2B is a detailed perspective view of a gap of the bulk eraser of FIG. 2A illustrating the configuration of the pole-tip portions at the gap, in an embodiment of the present invention.

With reference now to FIG. 2B, in accordance with an embodiment of the present invention, a detailed perspective view 200B of a gap 202 of the bulk eraser 201 of FIG. 2A illustrating the configuration of the pole-tip portions 242, 252 and 262 at the gap 202 is shown. The bulk eraser 201 includes a first source of magnetic flux, for example, first magnet 210, disposed opposite a second source of magnetic flux, for example, second magnet 230, across a first portion 222 of the gap 202. At least one of the first source of magnetic flux and the second source of magnetic flux produces sufficient magnetic-flux density in the second portion 224 of the gap 202 to erase the magnetic-recording disk in the HDD. At least one of the first source of magnetic flux and the second source of magnetic flux may be an electromagnet. Alternatively, at least one of the first source of magnetic flux and the second source of magnetic flux may be a high-field-strength, permanent magnet. The first source of magnetic flux may be a first magnet, for example, first magnet 210, composed of the material NdFeB and the second source of magnetic flux may be a second magnet, for example, second magnet 230, composed of the material NdFeB. The NdFeB material may have a grade between about grade 48 and about grade 54; the NdFeB material may also have a grade of about grade 50.

With further reference to FIG. 2B, in accordance with an embodiment of the present invention, the first source has first end pole 212 disposed proximate the first portion 222 of the gap 202, and the second source has a second end pole 232 disposed proximate the first portion 222 of the gap 202; the first and second end poles have 212 and 232 the same polarity, for example, both are north poles, or alternatively, both are south poles. The bulk eraser 201 also includes: a first pole piece 240, which has a first pole-tip portion 242 and is disposed on the first end pole 212 in proximity to the first portion 222 of the gap 202; a second pole piece 250, which has a second pole-tip portion 252 and is disposed on the second end pole 232 in proximity to the second portion 224 of the gap 202; and, a third pole piece 260, which has third pole-tip portion 262 and is disposed proximate to the second portion 224 of the gap 202. The first pole-tip portion 242, the second pole-tip portion 252, and the third pole-tip portion 262 define the second portion 224 of the gap 202 that is located between the first pole-tip portion 242, the second pole-tip portion 252, and the third pole-tip portion 262 and are configured such that magnetic-flux density in the second portion 224 of the gap 202 lies substantially parallel to a plane of the magnetic-recording disk, for example, magnetic-recording disk 120, to erase recorded information from a portion of the magnetic-recording disk when the HDD, for example, HDD 100, is inserted into the second portion 224 of the gap 202. As used herein, the term "lies substantially parallel to a plane of the magnetic-recording disk" means that the plane of the magnetic-recording disk is aligned parallel to the plane of the magnetic-flux density within the manufacturing tolerances for inserting the HDD 100 into the bulk eraser 201 and for providing magnetic-flux density within the bulk eraser that is about oriented within a plane in the second portion 224 of the gap 202.

With further reference to FIG. 2B, in accordance with an embodiment of the present invention, two trihedrals 204 and 206 are shown. Trihedral 204 is located at the center of the front of the first portion 222 of the gap 202. Trihedral 204 includes three vectors 204a, 204b and 240c orthogonally disposed with respect to one another in a right-handed configuration. Vectors 204a and 204b lie in a plane disposed in the center of the gap 202 halfway between the first end pole 212 and the second end pole 232 and separates the top of the gap 202 from the bottom of the gap 202; the plane defined by the vectors 204a and 204b lies substantially parallel to a plane of the magnetic-recording disk of the HDD when inserted into the gap to erase recorded information on the magnetic-recording disk. As used herein, the phrase "lies substantially parallel to a plane of the magnetic-recording disk" means about parallel with the plane of the magnetic recording disk within the manufacturing tolerances for insertion of the HDD into the bulk eraser 201, and for fabricating a bulk eraser. Vectors 204b and 204c lie in a median plane that bisects the gap 202 into two symmetrical halves, a left half and a right half, when viewed from the front of the gap 202. Thus, vector 204b lies on a line down the center of the gap 202, which lies in a substantially radial direction, for example, radial direction 174, of the portion of the magnetic-recording disk in the HDD when inserted into the gap to erase recorded information on the magnetic-recording disk. As used herein, the phrase "lies in a substantially radial direction" means about coincidentally with the radial direction within the manufacturing tolerances for insertion of the HDD into the bulk eraser 201, and for fabricating a bulk eraser. Vector 204c lies substantially perpendicular to the plane of the magnetic-recording disk of the HDD when inserted into the gap to erase recorded information on the magnetic-recording disk and is about parallel to the direction of the axis of the spindle on which the disk-stack is mounted. As used herein, the phrase "lies substantially perpendicular to the plane of the magnetic-recording disk" means about perpendicularly to the plane of the magnetic-recording disk within the manufacturing tolerances for insertion of the HDD into the bulk eraser 201, and for fabricating a bulk eraser. Vector 204a lies perpendicular to the median plane defined by vectors 204b and 204c; vector 204a and vector 204c lie in a plane at the front of the gap 202, which is parallel to the front side, for example, front side 102, of the HDD when inserted into the gap to erase recorded information on the magnetic-recording disk. The distance that separates the front plane of the gap 202 defined by the vectors 204a and 204c from the front side of the HDD is referred to by the term of art "stroke length," which is a measure of the distance that the HDD is inserted into the gap 202 of the bulk eraser, for example, bulk eraser 201.

With further reference to FIG. 2B, in accordance with an embodiment of the present invention, trihedral 206 is similarly located at the center of the front of the second portion 224 of the gap 202. Trihedral 206 includes three vectors 206a, 206b and 240c orthogonally disposed with respect to one another in a right-handed configuration. Vectors 206a and 206b lie in the same plane as vectors 204a and 204b that is disposed in the center of the gap 202 halfway between the first end pole 212 and the second end pole 232 and separates the top of the gap 202 from the bottom of the gap 202. Thus, the plane defined by the vectors 206a and 206b also lies substantially parallel to a plane of the magnetic-recording disk of the HDD when inserted into the gap to erase recorded information on the magnetic-recording disk. Vectors 206b and 206c lie in the same plane as vectors 204a and 204b that is the median plane that bisects the gap 202 into two symmetrical halves, a left half and a right half, when viewed from the front of the gap 202. Thus, vector 206b also lies on a line down the center of the gap 202, which lies in a substantially radial direction, for example, radial direction 174, of the portion of the magnetic-recording disk in the HDD when inserted into the gap to erase recorded information on the magnetic-recording disk. Similar to vector 204c, vector 206c lies substantially perpendicular to the plane of the magnetic-recording disk of the HDD when inserted into the gap to erase recorded information on the magnetic-recording disk and is about parallel to the direction of the axis of the spindle on which the disk-stack is mounted. Vector 206a lies perpendicular to the median plane defined by vectors 206b and 206c; vector 206a and vector 206c lie in a plane at the front of the second portion 224 of the gap 202 and in the back of the first portion 222 of the gap 202, which is located about where the magnetic-flux density becomes sufficient to erase recorded information from the magnetic-recording disk.

With further reference to FIG. 2B, in accordance with an embodiment of the present invention, the first pole-tip portion 242, the second pole-tip portion 252, and the third pole-tip portion 262 are configured such that the magnetic-flux density in the second portion 224 of the gap 202 lies in a substantially radial direction, for example, radial direction 174, of the portion of the magnetic-recording disk in the HDD from which recorded information is erased. The first pole-tip portion 242, the second pole-tip portion 252, and the third pole-tip portion 262 are configured to suppress magnetic-flux density in a third portion of the gap 202 such that the magnetization of the drive-motor magnet of the drive motor in the HDD is not degraded when located within the third portion. The first pole-tip portion 242, the second pole-tip portion 252, and the third pole-tip portion 262 are configured to confine the magnetic-flux density in the second portion 224 of the gap 202 to a region of the magnetic-recording disk sufficiently localized such that strength of eddy currents in the magnetic-recording disk are suppressed when rotating the magnetic-recording disk to erase recorded information on the magnetic-recording disk.

With further reference to FIG. 2B, in accordance with an embodiment of the present invention, the first pole-tip portion 242 may be configured to direct magnetic flux emanating from the first pole-tip portion 242 to the third pole-tip portion 262 and to concentrate magnetic-flux density in the second portion 224 of the gap 202 substantially parallel to a plane of the magnetic-recording disk in the HDD in the second portion 224 of the gap 202. For example, the first pole-tip portion 242 may be tapered to concentrate magnetic-flux density in the second portion 224 of the gap 202 substantially parallel to a plane of the magnetic-recording disk in the HDD in the second portion 224 of the gap 202. The second pole-tip portion 252 may be configured to direct magnetic flux emanating from the second pole-tip portion 252 to the third pole-tip portion 262 and to concentrate magnetic-flux density in the second portion 224 of the gap 202 substantially parallel to a plane of the magnetic-recording disk in the HDD in the second portion of the gap. For example, the second pole-tip portion 252 may also be tapered to concentrate magnetic-flux density in the second portion 224 of the gap 202 substantially parallel to a plane of the magnetic-recording disk in the HDD in the second portion 224 of the gap 202. The third pole-tip portion 262 may be configured to receive the magnetic flux emanating from the first pole-tip portion 242 and the magnetic flux emanating from the second pole-tip portion 252 and to concentrate magnetic-flux density in the second portion 224 of the gap 202 substantially parallel to a plane of the magnetic-recording disk in the HDD in the second portion 224 of the gap 202.

With further reference to FIG. 2B, in accordance with an embodiment of the present invention, alternatively, the third pole-tip portion 262 maybe configured to direct a second portion of magnetic flux emanating from the third pole-tip portion 262 to the first pole-tip portion 242 and to direct a second portion of magnetic flux emanating from the third pole-tip portion 262 to the second pole-tip portion 252 and to concentrate magnetic-flux density in the second portion 224 of the gap 202 substantially parallel to a plane of the magnetic-recording disk in the HDD in the second portion 224 of the gap 202. The first pole-tip portion 242 may be configured to receive the second portion of magnetic flux emanating from the third pole-tip portion 262 and to concentrate magnetic-flux density in the second portion 224 of the gap 202 substantially parallel to a plane of the magnetic-recording disk in the HDD in the second portion 224 of the gap 202. For example, the first pole-tip portion 242 may be tapered to concentrate magnetic-flux density in the second portion 224 of the gap 202 substantially parallel to a plane of the magnetic-recording disk in the HDD in the second portion 224 of the gap 202. The second pole-tip portion 252 may be configured to receive the second portion of magnetic flux emanating from the third pole-tip portion 262 and to concentrate magnetic-flux density in the second portion 224 of the gap 202 substantially parallel to a plane of the magnetic-recording disk in the HDD in the second portion 224 of the gap 202. For example, the second pole-tip portion 252 may also be tapered to concentrate magnetic-flux density in the second portion 224 of the gap 202 substantially parallel to a plane of the magnetic-recording disk in the HDD in the second portion 224 of the gap 202.

With further reference to FIG. 2A, in accordance with an embodiment of the present invention, the bulk eraser 201 further includes yoke 270 having first yoke portion 270a and second yoke portion 270b. The first yoke portion 270a is magnetically coupled with the first source of magnetic flux, for example, first magnet 210, and the third pole piece 260. The second yoke portion 270b is magnetically coupled with the second source of magnetic flux, for example, second magnet 230, and the third pole piece 260. The yoke 270 is configured to suppress stray magnetic flux and to increase magnetic-flux density in the second portion 224 of the gap 202.

With further reference to FIGS. 1 and 2A-2B, in accordance with an embodiment of the present invention, the bulk eraser 201 may be used in manufacturing of the HDD 100 to erase recorded information on the magnetic-recording disk 120. In manufacturing of the HDD 100, the bulk eraser 201 is provided that produces magnetic-flux density in a second portion 224 of the gap 202 that is sufficient to erase recorded information on the magnetic-recording disk, for example, magnetic-recording disk 120. Also, a HDD, for example, HDD 100, is provided; the HDD has an enclosure, a disk-stack having at least one magnetic-recording disk 120 rotatably mounted on a spindle 126 and a drive motor; the drive motor has a rotor such that the rotor is attached to the spindle for rotating the magnetic-recording disk 120 inside the enclosure. The plurality of magnets, for example, magnets 210 and 230, and a structure of the bulk eraser 201 are configured such that magnetic-flux density is oriented substantially parallel to a central plane, defined by vectors 206a and 206b, in the second portion 224 of the gap 202 and in a substantially radial direction, for example, radial direction 174, which is aligned with the vector 206b, of a portion of the magnetic-recording disk 120 when the HDD 100 is inserted into the second portion 224 of the gap 202. The magnetic-recording disk 120 is rotated in the HDD 100. The HDD 100 is inserted into the second portion 224 of the gap 202 of the bulk eraser 201 such that a plane of the magnetic-recording disk of the HDD is oriented substantially parallel to the central plane, defined by vectors 206a and 206b, in second portion 224 of the gap 202 such that magnetic-flux density is oriented in the substantially radial direction, for example, radial direction 174, which is aligned with the vector 206b, of the portion of the magnetic-recording disk. Consequently, the recorded information is erased from the portion of the magnetic-recording disk 120 in the HDD 100 located in the second portion 224 of the gap 202. The HDD 100 may then be removed from the second portion 224 of the gap 202.

With further reference to FIGS. 1 and 2A-2B, in accordance with an embodiment of the present invention, in using the bulk eraser 201 to manufacture the HDD 100, the pole pieces 240, 250 and 260 of the structure of the bulk eraser 201 and pole-tip portions 242, 252 in 262 of the pole pieces 240, 250 and 260 are configured such that magnetic-flux density in the second portion 224 of the gap 202 is oriented substantially parallel to a central flux-propagation direction in the second portion 224 of the gap 202. When the HDD is inserted into the second portion 224 of the gap 202 of the bulk eraser 201, the magnetic-recording disk 120 is oriented in the HDD 100 such that a radial direction 174 of a portion of the magnetic-recording disk 120 is oriented substantially parallel to the central flux-propagation direction, for example, the direction of the vector 206b, in the second portion 224 of the gap 202. Also, upon inserting the HDD 100 into the second portion of the gap, the HDD 100 is inserted with an insertion speed that is sufficient to assure complete erasure of recorded information on the magnetic-recording disk in the HDD 100. A sufficient insertion speed into the gap 202 is less than or equal to 1 centimeter per second (cm/sec). When the HDD is removed from the second portion 224 of the gap 202 of the bulk eraser 201, the HDD 100 is removed from the second portion 224 of the gap 202 with a removal speed that is sufficient to assure complete erasure of recorded information on the magnetic-recording disk 120 in the HDD 100. A sufficient removal speed from the gap is less than or equal to 1 cm/sec.

With further reference to FIGS. 1 and 2A-2B, in accordance with an embodiment of the present invention, when the magnetic-recording disk 120 is rotated in the HDD 100, the magnetic-recording disk 120 is rotated in the HDD with the drive motor at a rotation speed that is sufficient to assure complete erasure of recorded information on the magnetic-recording disk 120 in the HDD 100 without stalling the drive motor. A sufficient rotation speed of the magnetic-recording disk 120 is less than or equal to 2 Hertz (Hz). When rotating the magnetic-recording disk 120 in the HDD 100 with the drive motor, the drive motor is driven by a low speed drive-motor-driver circuit on-board in the HDD 100 to provide power to the drive motor to rotate the magnetic-recording disk 120 at a slow speed to prevent stalling of the drive motor. When rotating the magnetic-recording disk in the HDD 100 with the drive motor, power is provided to the low speed drive-motor-driver circuit on-board in the HDD 100. This power may be provided to the low speed drive-motor-driver circuit on-board in the HDD 100 by attaching a cable and connector, attached to an external power supply, to the HDD 100.

With further reference to FIGS. 1 and 2A-2B, in accordance with an embodiment of the present invention, in using the bulk eraser 201 to manufacture the HDD 100, the second portion 224 of the gap 202 is provided with sufficient clearance to accommodate the HDD 100 upon inserting and removing the HDD 100 from the second portion 224 of the gap 202. A sufficient clearance of the second portion 224 of the gap 202 may be less than or equal to about 2.6 centimeters (cm). Moreover, a fixture may be provided for rapidly and reproducibly aligning the HDD 100 in the second portion 224 of the gap 202. The fixture limits a stroke length upon inserting the HDD 100 into the second portion 224 of the gap 202 such that the magnetic-flux density produced by the plurality of magnets, for example, magnets 210 in 230, and the structure is configured to erase recorded information from the portion of the magnetic-recording disk 120 disposed in the second portion 224 of the gap 202 without degrading the magnetization of a drive-motor magnet in the drive motor disposed in a third portion of the gap 202. In addition, two magnets, for example, magnets 210 in 230, of the plurality of magnets are disposed with opposing polarity across the first portion 222 of the gap 202; a separation between the two magnets of the plurality of magnets may be adjusted in the first portion 222 of the gap 202 such that the first portion 222 of the gap 202 has sufficient clearance to accommodate the HDD 100 upon inserting and removing the HDD 100 from the second portion 224 of the gap 202 and the magnetic-flux density produced by the plurality of magnets and the structure is sufficient to erase recorded information from a plurality of magnetic-recording disks of the disk-stack when the HDD 100 is inserted into the second portion 224 of the gap 202.

Consequently, a HDD 100 manufactured using a bulk eraser 201 for erasing recorded information on a magnetic-recording disk 120 in a HDD 100 lies within the spirit and scope of embodiments of the present invention. In accordance with embodiments of the present invention, the HDD 100 includes at least one magnetic-recording disk 120 in a disk-stack of the HDD 100 from which recorded information has been erased by the bulk eraser 201. For example, in a re-work procedure of the manufacturing process the recorded information may be a first servo pattern erased by the bulk eraser to prepare the magnetic-recording disk to write a second servo pattern to replace the first servo pattern. Moreover, the recorded information may be recorded data on the magnetic-recording disk 120 in the HDD 100, which is erased to preserve the security of the recorded data.

Figure 3A:
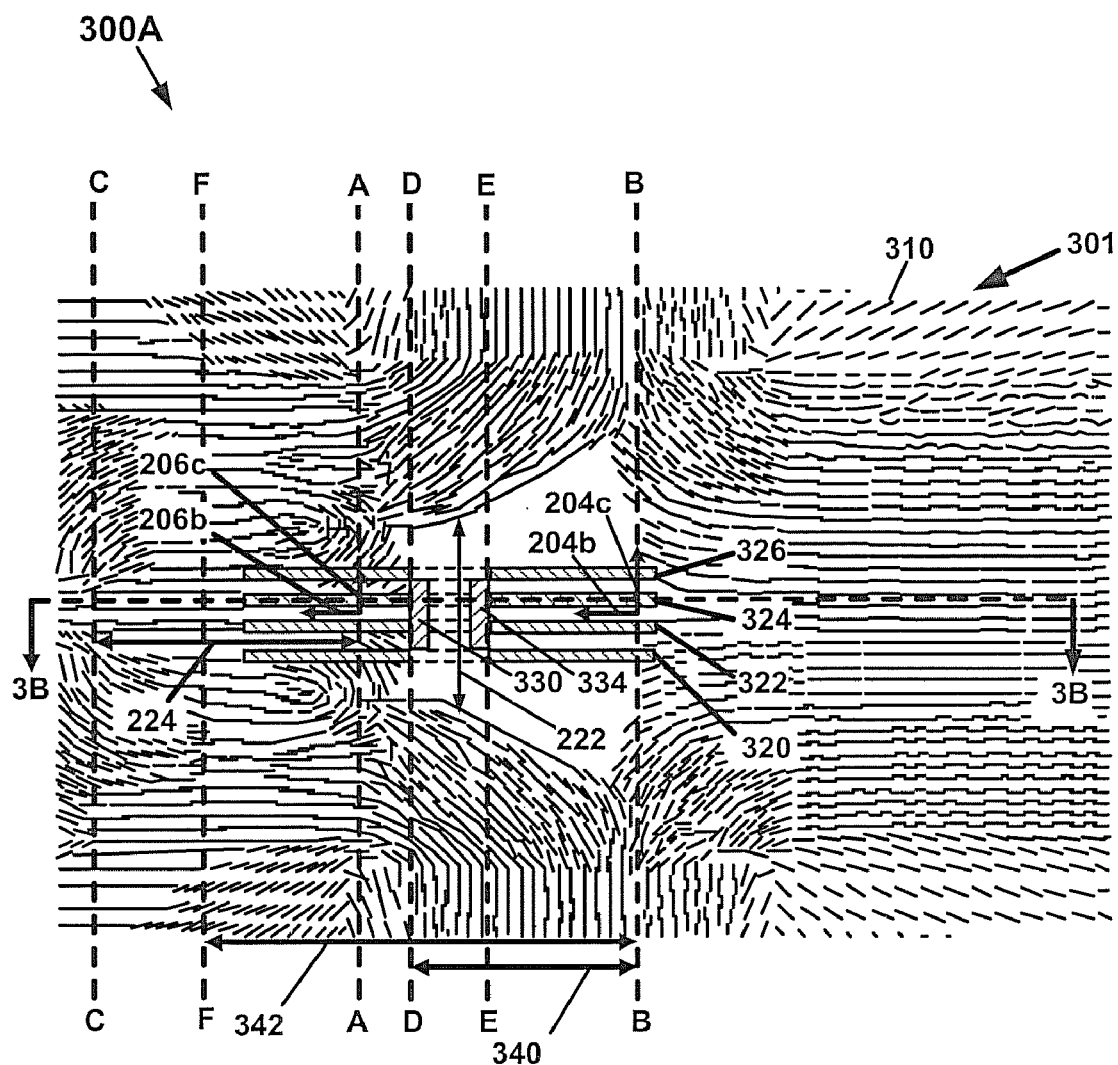
FIG. 3A is a plot of the distribution of magnetic-flux density at the gap of the bulk eraser of FIGS. 2A and 2B showing the distribution of magnetic-flux density with respect to a disk-stack in the HDD, in an embodiment of the present invention.

With reference now to FIG. 3A, in accordance with an embodiment of the present invention, a plot 300A of the distribution 301 of magnetic-flux density at the gap 202 of the bulk eraser 201 of FIGS. 2A and 2B is shown. FIG. 3A shows the distribution 301 of magnetic-flux density with respect to a disk-stack, including magnetic-recording disks 320, 322, 324 and 326, in a HDD, for example, HDD 100. The magnetic-recording disk 326 at the top of the disk-stack may be identified with the magnetic-recording disk 120 of FIG. 1. The magnetic-flux density in the distribution 301 is indicated by the magnitude and direction of the arrows shown in FIG. 3A, for example, the magnetic-flux-density vector 310. The plane of FIG. 3A coincides with the median plane defined by vectors 206b and 206c and defined by vectors 204b and 204c of FIG. 2A. The traces of several planes are indicated, which serve to show the various portions of the gap 202. The trace of the plane 3B-3B corresponds to a plane parallel to the plane of the magnetic-recording disk 324; the plane 3B-3B also corresponds to the plane of the FIG. 3B, subsequently described. The trace of plane A-A indicated by a dashed line coincides with the plane at the front of the second portion 224 of the gap 202 and in the back of the first portion 222 of the gap 202, in which vector 206a and vector 206c lie as shown in FIG. 2A. The trace of plane B-B indicated by a dashed line coincides with the plane at the front of the first portion 222 of the gap 202, in which vector 204a and vector 204c lie as shown in FIG. 2A. Thus, the first portion 222 of the gap 202 lies between the plane A-A and the plane B-B; the first portion 222 of the gap 202 lies between the outer surfaces of the first pole piece 240 in the second pole piece 250; these outer surfaces are indicated by the arrow-heads of the vertical arrow indicating the location of the first portion 222 of the gap 202, which coincide with the boundaries of a relatively feel free area shown at the center of FIG. 3A. The trace of plane C-C indicated by a dashed line coincides with the plane in the back of the second portion 224 of the gap 202, which lies at the face of the third pole-tip portion 262. Thus, the second portion 224 of the gap 202, indicated by the double headed arrow, lies between the plane A-A and the plane C-C. As shown in FIG. 3A, the distribution 301 of magnetic-flux density in the second portion 224 of the gap 202 is intense as indicated by the magnitude and crowding of the arrows associated with the magnetic-flux-density vectors. As shown in FIG. 3A, magnetic-flux density in the second portion 224 of the gap 202 defined by first pole-tip portion 242, the second pole-tip portion 252; and the third pole-tip portion 262 and located between the first pole-tip portion 242, the second pole-tip portion 252, and the third pole-tip portion 262 lies substantially parallel to a plane of the magnetic-recording disk, for example, to plane 3B-3B of the magnetic-recording disks 324, as well as to each of the planes of the remaining magnetic-recording disks 320, 324 and 326 of the disk-stack, to erase recorded information from a portion of the magnetic-recording disk when the HDD, for example, HDD 100, is inserted into the second portion 224 of the gap 202.

With further reference to FIG. 3A and as shown therein, in accordance with an embodiment of the present invention, the end poles 212 and 232 of the first magnet 210 and the second magnet 230 are south poles so that the magnetic-flux-density vectors are directed towards the first pole-tip portion 242 and the second pole-tip portion 252 from the third pole-tip portion 262. Thus, the third pole-tip portion 262 is configured to direct a first portion of magnetic flux emanating from the third pole-tip portion 262 to the first pole-tip portion 242 and to direct a second portion of magnetic flux emanating from the third pole-tip portion 262 to the second pole-tip portion 252 and to concentrate magnetic-flux density in the second portion 222 of the gap 202 substantially parallel to a plane of the magnetic-recording disk, for example, to plane 3B-3B of the magnetic-recording disks 324, in the HDD in the second portion 222 of the gap 202. The first pole-tip portion 242 is configured to receive the first portion of magnetic flux emanating from the third pole-tip portion 262 and to concentrate magnetic-flux density in the second portion 224 of the gap 202 substantially parallel to a plane of the magnetic-recording disk, for example, each of the magnetic-recording disks 320, 322, 324 and 326 of the disk-stack, in the HDD 100 in the second portion 224 of the gap 202. The second pole-tip portion 252 is configured to receive the second portion of magnetic flux emanating from the third pole-tip portion 262 and to concentrate magnetic-flux density in the second portion 224 of the gap 202 substantially parallel to a plane of the magnetic-recording disk, for example, to plane 3B-3B of the magnetic-recording disks 324, in the HDD 100 in the second portion 224 of the gap 202.

Alternatively, the end poles 212 and 232 of the first magnet 210 and the second magnet 230 may be north poles so that the magnetic-flux-density vectors are directed towards the third pole-tip portion 262 from the first pole-tip portion 242 and the second pole-tip portion 252. Thus, the first pole-tip portion 242 may be configured to direct magnetic flux emanating from the first pole-tip portion 242 to the third pole-tip portion 262 and to concentrate magnetic-flux density in the second portion 224 of the gap 202 substantially parallel to a plane of the magnetic-recording disk, for example, to plane 3B-3B of the magnetic-recording disks 324, in the HDD 100 in the second portion 224 of the gap 202. The second pole-tip portion 252 may be configured to direct magnetic flux emanating from the second pole-tip portion 252 to the third pole-tip portion 262 and to concentrate magnetic-flux density in the second portion 224 of the gap 202 substantially parallel to a plane of the magnetic-recording disk, for example, each of the magnetic-recording disks 320, 322, 324 and 326 of the disk-stack, in the HDD 100 in the second portion 224 of the gap 202. The third pole-tip portion 262 may be configured to receive the magnetic flux emanating from the first pole-tip portion 242 and the magnetic flux emanating from the second pole-tip portion 252 and to concentrate magnetic-flux density in the second portion 224 of the gap 202 substantially parallel to a plane of the magnetic-recording disk, for example, to plane 3B-3B of the magnetic-recording disks 324, in the HDD 100 in the second portion 224 of the gap 202.

With further reference to FIG. 3A, in accordance with an embodiment of the present invention, the trace of plane D-D indicated by a dashed line coincides with a plane tangent to the surface of a drive-motor magnet 330 proximate to the second portion 224 of the gap 202. The trace of plane E-E indicated by a dashed line coincides with a plane tangent to the surface of a drive-motor magnet 334 proximate to the front of the first portion 222 of the gap 202. The space in the first portion 222 of the gap 202 between the front of the first portion 222 of the gap 202, plane B-B, and plane D-D defines the third portion 340 of the gap 202. The magnetic-flux density produced by the plurality of magnets and the structure is configured to erase recorded information from the magnetic-recording disk disposed in the second portion 224 of the gap 202 without degrading the magnetization of a drive-motor magnet, for example, drive-motor magnet 330 and drive-motor magnet 334, in the drive motor disposed in the third portion 340 of the gap 202. Moreover, the first pole-tip portion 242, the second pole-tip portion 252, and the third pole-tip portion 262 are configured to suppress magnetic-flux density in a third portion 340 of the gap 202 such that the magnetization of the drive-motor magnet, for example, drive-motor magnet 330 and drive-motor magnet 334, of the drive motor in the HDD is not degraded when located within the third portion 340. The trace of plane F-F indicated by a dashed line coincides with the front side 102 of the HDD 100. The stroke length 342 is the distance between the plane F-F and the plane B-B indicated by the double headed arrow labeled 342 and determines the maximum safe distance that the HDD 100 can be inserted into the gap 202 without erasing the drive-motor magnets, for example, drive-motor magnet 330 and drive-motor magnet 334.

Figure 3B:
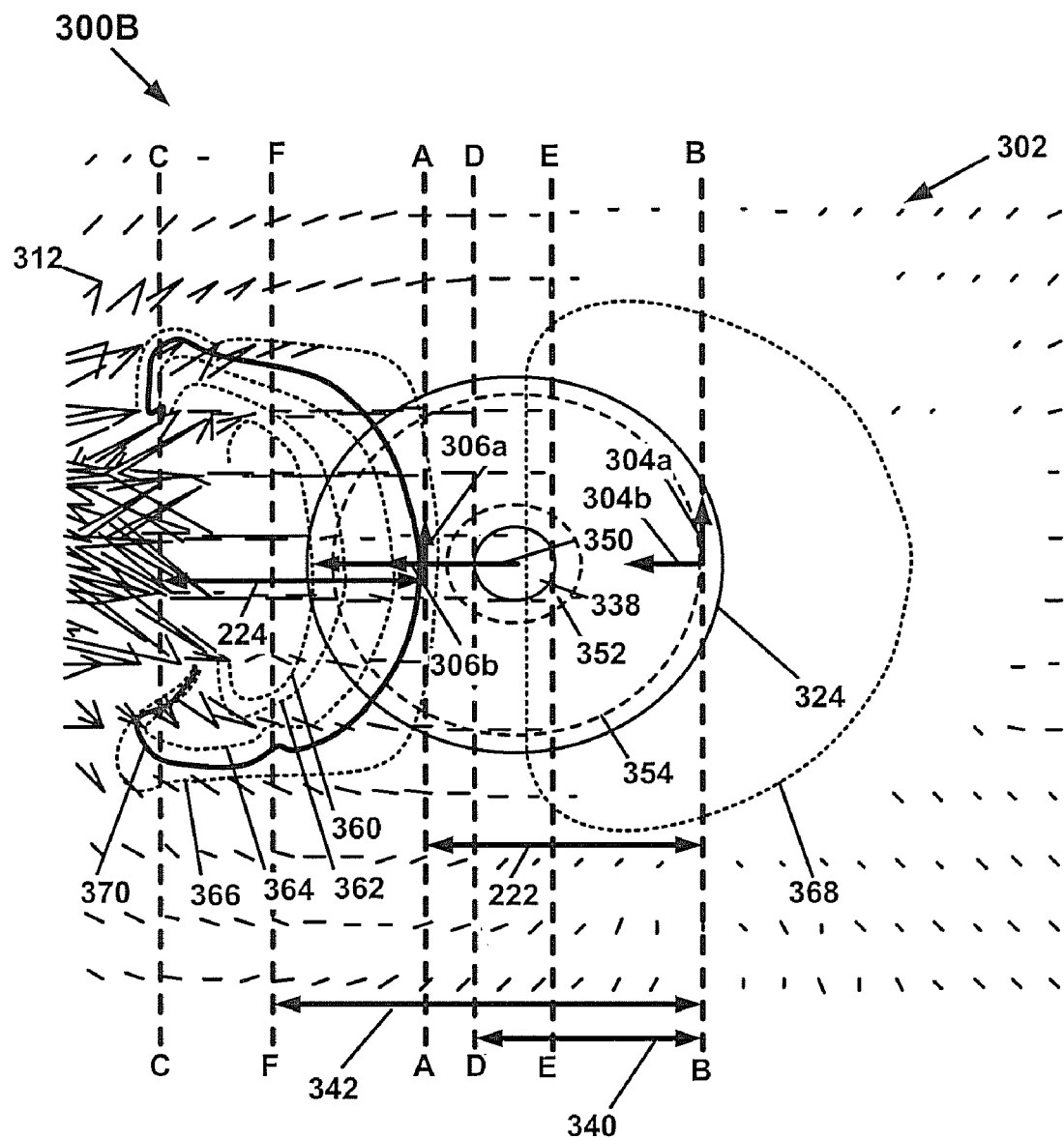
FIG. 3B is a plot of the distribution of magnetic-flux density and contours of constant magnitude of magnetic-flux density in the plane 3B-3B of one magnetic-recording disk of the disk-stack of FIG. 3A showing a portion of the disk wherein the magnetic-flux density is sufficient to erase recorded information, in an embodiment of the present invention.

With reference now to FIG. 3B, in accordance with an embodiment of the present invention, a plot 300B of the distribution 302 of magnetic-flux density and contours 360, 362, 364, 368 and 370 of constant magnitude of magnetic-flux density in the plane 3B-3B of one magnetic-recording disk 324 of the disk-stack of FIG. 3A is shown. In contrast with FIG. 3A, the magnetic-flux-density vectors are directed towards the third pole-tip portion 262, as for the case when the first end pole 212 and the second end pole 232 are north poles instead of the south poles as for FIGS. 2A, 2B and 3A; this change of polarity is of little consequence for the description, as the bulk eraser 201 can work with end poles of either polarity are previously described, as long as the end poles 212 and 232 have the same polarity. FIG. 3B shows a portion of the disk wherein the magnetic-flux density is sufficient to erase recorded information. The magnetic-flux density in the distribution 302 is indicated by the magnitude and direction of the arrows shown in FIG. 3A, for example, the magnetic-flux-density vector 312. The plane of FIG. 3A coincides with the plane 3B-3B of the magnetic-recording disk 324 of FIG. 3A. Several contours 360, 362, 364, 368 and 370 of constant magnitude of magnetic-flux density are indicated. The traces of several planes, for example, planes A-A, B-B, C-C, D-D, E-E and F-F, are indicated, which serve to identify the various portions of the gap 202 as previously described for FIG. 3B. The magnetic-recording disk 324 has a radial direction 350, an OD track 354 and an ID track 352. The outside diameter 338 of the drive motor is shown as the drive motor is disposed in the gap 202 of the bulk eraser 201. Contours closer to the trace of plane C-C, which lies at the face of the third pole-tip portion 262, correspond to magnetic-flux-density vectors that have greater magnitude. For example, contour 360 has the greatest magnitude and contour 368 has the least magnitude; this is also indicated by the density of magnetic-flux-density vectors located within the contour; for example, contour 368 shows virtually no magnetic-flux density vectors of measurable magnitude. The contour 370 corresponds to a magnetic-flux density sufficient to erase a portion of the magnetic-recording disk 324; the portion of the magnetic-recording disk 324 that lies between contour 370 and the outside perimeter of the magnetic-recording disk 324 defines the portion of the magnetic-recording disk 324 where the magnetic-flux density is sufficient to erase recorded information on the magnetic-recording disk 324 in the disk-stack of the HDD 100.

With further reference to FIG. 3B, in accordance with an embodiment of the present invention, the magnetic-flux-density vectors in the portion of the magnetic-recording disk where the magnetic-flux density is sufficient to erase recorded information are such that the magnetic-flux density in the second portion 224 of the gap 202 lies in the substantially radial direction 350 of the portion of the magnetic-recording disk 324 in the HDD 100. As used herein, the phrase "lies in the substantially radial direction" means that the directions of the magnetic-flux-density vectors are aligned as a whole as parallel as to the radial direction as can be obtained within manufacturing tolerances. Because an individual magnetic-flux-density vector may deviate from the radial direction 350 and the magnetic-flux-density vectors are symmetrically disposed about the radial direction 350, on the average, the deviations of all the magnetic-flux-density vectors in the second portion 224 of the gap 202 from the radial direction 350 is about zero, when the magnetic-flux density in the second portion 224 of the gap 202 lies in the substantially radial direction 350 of the portion of the magnetic-recording disk 324. The stroke length 342 is also shown indicating the relative disposition of the HDD 100 in the distribution 302 of the magnetic-flux density in the gap 202 of the bulk eraser 201. As the plane 3B-3B does not coincide with plane disposed in the center of the gap 202 halfway between the first end pole 212 and the second end pole 232, which separates the top of the gap 202 from the bottom of the gap 202, defined by the vectors 204a and 204b and vectors 206a and 20b of FIG. 2B, the corresponding projection vectors of these vectors onto the plane 3B-3B are shown: vectors 304a and 304b and vectors 306a and 306b, respectively. Therefore, vectors 304a and 306a lie in the same median plane as vectors 204a and 206a that bisects the gap 202 into two symmetrical halves, a left half and a right half, when viewed from the front of the gap 202. As the median plane of the bulk eraser is located at a central portion of the gap it contains a central flux-propagation direction for each disk in the disk-stack; a radial direction 350 of a portion of the magnetic-recording disk 324 is oriented substantially parallel to the central flux-propagation direction, for example, the direction of the vector 306b, in the second portion 224 of the gap 202. Even though the magnetic-recording disk has a plurality of radial directions, a radial direction of a portion of the magnetic-recording disk, as used herein, refers to a radial direction substantially aligned within the median plane of the bulk eraser as shown in FIG. 3B. Therefore, such a radial direction, as used herein, may provide a maximum stroke length that precludes erasure of a drive-motor magnet, yet allows the greatest portion of a magnetic-recording disk to be disposed within a portion of the distribution of magnetic-flux density sufficient to erase the portion of the magnetic-recording disk.

With further reference to FIG. 3B, in accordance with an embodiment of the present invention, the plurality of magnets, for example, magnets 210 in 230, and the structure are configured to direct the magnetic-flux density in a substantially radial direction, for example, radial direction 350, of the portion of the magnetic-recording disk, for example, magnetic-recording disk 324, in the HDD 100 in the second portion 224 of the gap 202. The intensity of a field component of the magnetic-flux density directed along the radial direction, for example, radial direction 350, in the plane of the magnetic-recording disk, for example, magnetic-recording disk 324, produced by the plurality of magnets and the structure has a gradient as a function of distance along the radial direction, for example, radial direction 350, at a transition region between the second portion 224 of the gap 202 and the third portion 340 of the gap 202 such that the gradient allows erasing recorded information from the magnetic-recording disk in close proximity to the drive-motor magnet in the drive motor, for example, indicated by the outside diameter 338 of the drive motor, without degrading the magnetization of the drive-motor magnet, for example, drive-motor magnets 330 in 334, in the drive motor. As shown in FIG. 3B, the transition region lies substantially within the first portion 222 of the gap 202 between plane A-A and plane D-D; however, as shown in FIG. 3B the transition region may extend from plane A-A somewhat into the second portion 224 of the gap 202 to the contour 370 corresponding to magnetic-flux density sufficient to erase a portion of the magnetic-recording disk, for example, magnetic-recording disk 324. Moreover, the first pole-tip portion 242, the second pole-tip portion 252, and the third pole-tip portion 262 are configured such that the magnetic-flux density in the second portion 224 of the gap 202 lies in a substantially radial direction, for example, radial direction 350, of the portion of the magnetic-recording disk, for example, magnetic-recording disk 324, in the HDD 100, which is indicated by the numerous magnetic-flux-density vectors lying parallel to the radial direction 350 in FIG. 3B. Moreover, the plurality of magnets, for example, magnets 210 in 230, and the structure are configured to produce the magnetic-flux density such that the magnetic-flux density is applied to a localized portion of the magnetic-recording disk, for example, the portion, without limitation thereto, of the magnetic-recording disk 324 that lies between contour 370 and the outside perimeter of the magnetic-recording disk 324, to suppress eddy currents in the magnetic-recording disk, for example, magnetic-recording disk 324, of the HDD 100.

Figure 4A:
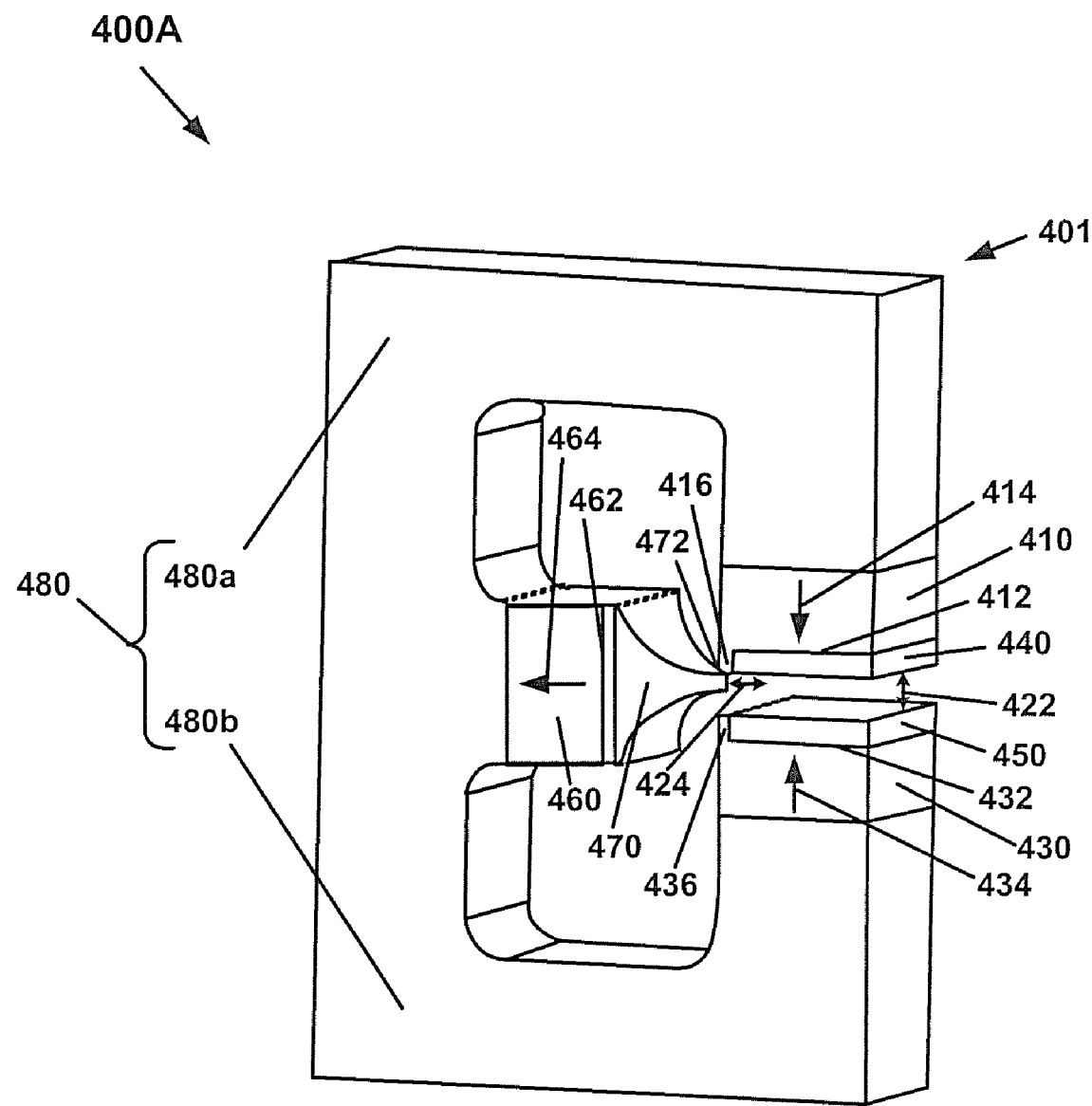
FIG. 4A is a perspective view of an alternative embodiment of a bulk eraser showing three magnets and a structure magnetically coupled with the three magnets to produce magnetic-flux density in a gap sufficient to erase recorded information from a portion of the magnetic-recording disk in a disk-stack of the HDD, in an embodiment of the present invention.

Physical Description of Embodiments of the Present Invention for a Bulk Eraser Including at Least Three Magnets Configured for Erasing Recorded Information With reference now to FIG. 4A, in accordance with an embodiment of the present invention, a perspective view 400A of an alternative embodiment of a bulk eraser 401 is shown. FIG. 4A shows at least three magnets 410, 430 and 460 and a structure magnetically coupled with the at least three magnets 410, 430 and 460 to produce magnetic-flux density in a gap sufficient to erase recorded information from a portion of the magnetic-recording disk, for example, magnetic-recording disk 120, in a disk-stack of the HDD, for example, HDD 100. The bulk eraser 401 includes at least three magnets 410, 430 and 460 and a structure magnetically coupled with the at least three magnets 410, 430 and 460 to produce magnetic-flux density in a gap. In one embodiment of the present invention, as shown in FIG. 4A, the structure may include a yoke 480 including a first yoke portion 470a and a second yoke portion 470b, a first shield 440, a second shield 450 and a pole piece 470 having a third pole-tip portion 472. The first magnet 410 has a first pole-tip portion 416; the second magnet 430 has a second pole-tip portion 436; and the pole piece 470 has a third pole-tip portion 472, all of which serve to produce magnetic-flux density in a gap. The gap, similar to gap 202 of FIGS. 2A and 2B, has a first portion 422, a second portion 424 and a third portion, similar to third portion 340 of FIGS. 3A and 3B. The first magnet 410 and a second magnet 430 are disposed with opposing end poles 412 and 432, respectively, of the same polarity across the first portion 422 of the gap. The direction 414 of the B-field, the magnetic-flux density, as well as the magnetization field, in the first magnet 410 is shown by the upper arrow. The upper arrow indicates that a first end pole 412 proximate the first portion 422 of the gap has the polarity of a north pole, and the end pole of the first magnet 410 opposite the north pole has the polarity of a south pole. The arrow also indicates the direction of magnetic flux propagation through the first magnet 410. Similarly, the direction 434 of the B-field, the magnetic-flux density, as well as the magnetization field, in the second magnet 430 is shown by the lower arrow. The lower arrow indicates that a second end pole 432 proximate first portion 422 of the gap has the polarity of a north pole, and the end pole of the second magnet 430 opposite the north pole has the polarity of a south pole. The arrow also indicates the direction of magnetic flux propagation through the second magnet 430. The direction 464 of the B-field, the magnetic-flux density, as well as the magnetization field, in the third magnet 460 is shown by the horizontal arrow. The horizontal arrow indicates that a third end pole 462 proximate the first portion 422 of the gap has the polarity of a south pole, and the end pole of the third magnet 460 opposite the south pole has the polarity of a north pole. The arrow also indicates the direction of magnetic flux propagation through the first magnet 460.

With further reference to FIG. 4A, in accordance with an embodiment of the present invention, at least one of the at least three magnets 410, 430 and 460 may be a high-field-strength, permanent magnet, which may be composed of a material such as neodymium iron boron, NdFeB. The grade of the NdFeB material used for at least one magnet of the three magnets 410, 430 and 460 may have a grade between about grade 48 and about grade 54; however, a grade of about grade 50 provides a very stable magnet. The at least three magnets 410, 430 and 460 and the structure are configured to produce a magnetic-flux density in the second portion 424 of the gap sufficient to erase recorded information from a portion of at least one magnetic-recording disk, for example, magnetic-recording disk 120, in a disk-stack of the HDD 100 when the HDD 100 is inserted into the second portion 424 of the gap. The at least three magnets 410, 430 and 460 and the structure are configured to direct the magnetic-flux density in a substantially radial direction of the portion of the magnetic-recording disk, similar to radial direction 350 of the magnetic-recording disk 324 of FIG. 3B as previously described, in the HDD 100 in the second portion 424 of the gap.

With further reference to FIG. 4A and as previously described in FIGS. 3A and 3B for similar embodiments of the present invention, in accordance with an embodiment of the present invention, the third magnet 460 is disposed across the second portion 424 of the gap opposite the first magnet 410 and the second magnet 430 with a end pole of the third magnet 462 of opposite polarity to the end poles 412 and 432 of the first magnet 410 and the second magnet 430, respectively. The at least three magnets 410, 430 and 460 and the structure are configured to produce a magnetic-flux density sufficient to erase recorded information from portions of a plurality of magnetic-recording disks, for example, similar to disks 320, 322, 324 in 326 as previously described for FIG. 3A, in a disk-stack of the HDD 100. The at least three magnets 410, 430 and 460 and the structure are configured to produce the magnetic-flux density such that the magnetic-flux density is applied to a localized portion of the magnetic-recording disk to suppress eddy currents in the magnetic-recording disk of the HDD 100, as previously described above. The magnetic-flux density produced by the at least three magnets 410, 430 and 460 and the structure is configured to erase recorded information from the magnetic-recording disk, for example, similar to magnetic-recording disk 324, disposed in the second portion 424 of the gap without degrading the magnetization of a drive-motor magnet, for example, similar to drive-motor magnets 330 and 334, in the drive motor disposed in the third portion of the gap, for example, similar to the third portion 340 described above for FIGS. 3A and 3B. The intensity of a field component of the magnetic-flux density directed along the radial direction, for example, similar to radial direction 350, in the plane of the magnetic-recording disk, for example, similar to magnetic-recording disk 324, produced by the at least three magnets 410, 430 and 460 and the structure has a gradient as a function of distance along the radial direction at a transition region, similar to the transition region described above for FIG. 3B, between the second portion 424 of the gap and the third portion, for example, similar to the third portion 340 described above for FIGS. 3A and 3B, of the gap such that the gradient allows erasing recorded information from the magnetic-recording disk in close proximity to the drive-motor magnet, for example, similar to drive-motor magnets 330 and 334, in the drive motor without degrading the magnetization of the drive-motor magnet in the drive motor.

Figures 4B, 4C:
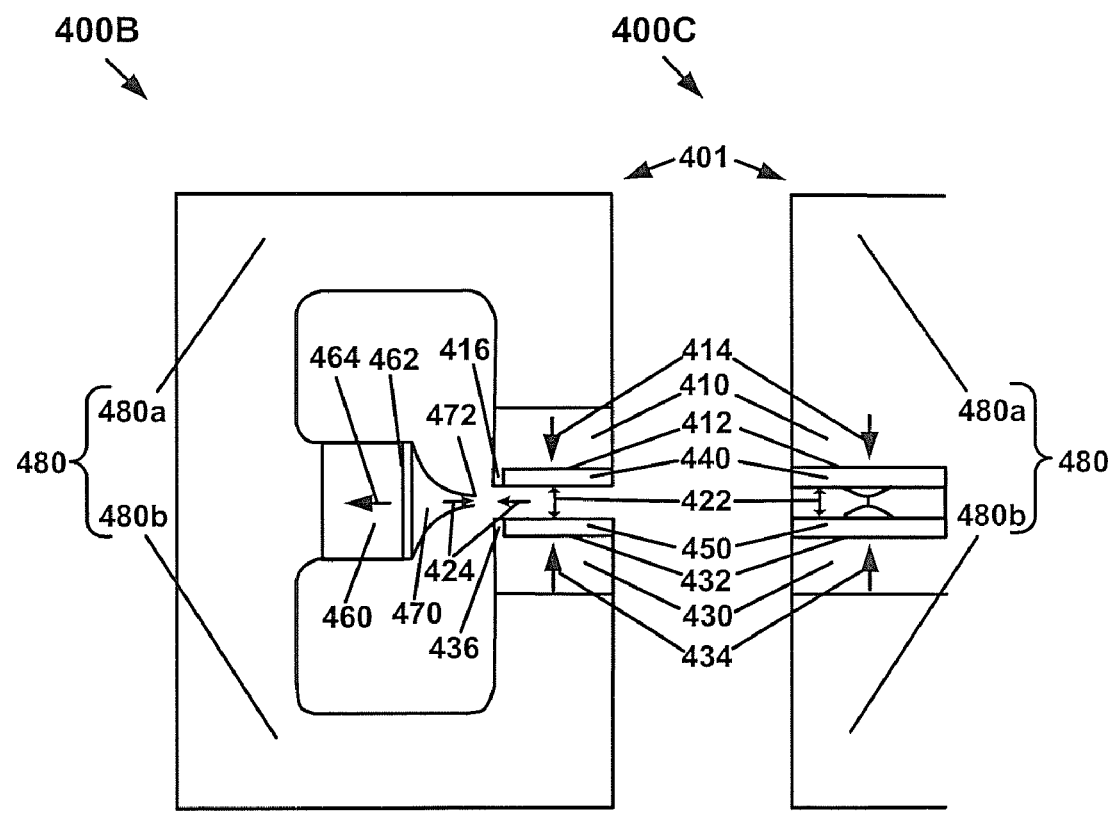
FIG. 4B is an elevation view of a left side of the bulk eraser of FIG. 4A, in an embodiment of the present invention.
FIG. 4C is an elevation view of a front side of the bulk eraser of FIG. 4A, in an embodiment of the present invention.

With reference now to FIGS. 4B and 4C, in accordance with an embodiment of the present invention, an elevation view 400B of a left side and an elevation view 400C of a front side of the bulk eraser 401 of FIG. 4A are shown. The bulk eraser 401 includes a first magnet 410 disposed opposite a second magnet 430 across a first portion 422 of a gap, for example, similar to gap 202 shown in FIG. 2A. The first magnet 410 has first end pole 412 disposed proximate the first portion 422 of the gap and first pole-tip portion 416 disposed proximate the second portion 424 of the gap. The second magnet 430 has the second end pole 432 disposed proximate the first portion 422 of the gap and second pole-tip portion 436 disposed proximate the second portion 424 of the gap. The first and second end poles 412 and 432 have same polarity, as described above. The bulk eraser 401 also includes a first magnetic shield 440, which is disposed on the first end pole 412 in proximity to the first portion 422 of the gap, and a second magnetic shield 450, which is disposed on the second end pole 432 in proximity to the first portion 422 of the gap. The bulk eraser 401 also includes a third magnet 460, which is disposed proximate to the second portion 424 of the gap. The third magnet 460 has a third end pole 462, which is disposed proximate the second portion 424 of the gap. The third end pole 462 has a polarity opposite to the first and second end poles 412 and 432. The bulk eraser 401 also includes the pole piece 470, which is disposed on the third end pole 462 in proximity to the second portion 424 of the gap. The pole piece 470 has a third pole-tip portion 472. The first pole-tip portion 416, the second pole-tip portion 436, and the third pole-tip portion 472 define a second portion 424 of the gap located between the first pole-tip portion 416, the second pole-tip portion 436, and the third pole-tip portion 472 and are configured such that magnetic-flux density in the second portion 424 of the gap lies substantially parallel to a plane of the magnetic-recording disk, for example, similar to plane 3B-3B of the magnetic-recording disks 324 as shown in FIG. 3B, in a disk-stack of the hard-disk drive to erase recorded information from a portion on the magnetic-recording disk, for example, similar to the portion of the magnetic-recording disk 324 that lies between contour 370 and the outside perimeter of the magnetic-recording disk 324 as shown in FIG. 3B, when the hard-disk drive is inserted into the second portion 424 of the gap. The first pole-tip portion 416, the second pole-tip portion 436, and the third pole-tip portion 472 are configured such that the magnetic-flux density in the second portion 424 of the gap lies in a substantially radial direction, for example, similar to radial direction 350 as shown in FIG. 3B, of the portion of the magnetic-recording disk of the hard-disk drive. The first pole-tip portion 416, the second pole-tip portion 436, and the third pole-tip portion 472 are configured to suppress magnetic-flux density in a third portion of the gap, for example, similar to the third portion 340 described above for FIGS. 3A and 3B, such that the magnetization of the drive-motor magnet of the drive motor in the hard-disk drive is not degraded when located within the third portion.

With further reference to FIGS. 4B and 4C, in accordance with an embodiment of the present invention, the end poles 412 and 432 of the first magnet 410 and the second magnet 430 are north poles so that the magnetic-flux-density vectors are directed towards the third pole-tip portion 472 from the first pole-tip portion 416 and the second pole-tip portion 436. Thus, the first pole-tip portion 416 is configured to direct magnetic flux emanating from the first pole-tip portion 416 to the third pole-tip portion 472 and to concentrate magnetic-flux density in the second portion 424 of the gap, similar to gap 202 shown in FIG. 2B, substantially parallel to a plane of the magnetic-recording disk, for example, similar to plane 3B-3B of the magnetic-recording disks 324, in the HDD 100 in the second portion 424 of the gap. The second pole-tip portion 436 is configured to direct magnetic flux emanating from the second pole-tip portion 436 to the third pole-tip portion 472 and to concentrate magnetic-flux density in the second portion 424 of the gap substantially parallel to a plane of the magnetic-recording disk, for example, similar to each of the magnetic-recording disks 320, 322, 324 and 326 of the disk-stack shown in FIG. 3A, in the HDD 100 in the second portion 424 of the gap. The third pole-tip portion 472 is configured to receive the magnetic flux emanating from the first pole-tip portion 416 and the magnetic flux emanating from the second pole-tip portion 436 and to concentrate magnetic-flux density in the second portion 424 of the gap substantially parallel to a plane of the magnetic-recording disk, for example, similar to plane 3B-3B of the magnetic-recording disks 324, in the HDD 100 in the second portion 424 of the gap.

Alternatively, the end poles 412 and 432 of the first magnet 410 and the second magnet 430 may be south poles so that the magnetic-flux-density vectors are directed towards the first pole-tip portion 416 and the second pole-tip portion 436 from the third pole-tip portion 472. Thus, the third pole-tip portion 472 may be configured to direct a first portion of magnetic flux emanating from the third pole-tip portion 472 to the first pole-tip portion 416 and to direct a second portion of magnetic flux emanating from the third pole-tip portion 472 to the second pole-tip portion 436 and to concentrate magnetic-flux density in the second portion 222 of the gap, similar to gap 202 shown in FIG. 2B, substantially parallel to a plane of the magnetic-recording disk, for example, similar to plane 3B-3B of the magnetic-recording disks 324, in the HDD in the second portion 222 of the gap. The first pole-tip portion 416 may be configured to receive the first portion of magnetic flux emanating from the third pole-tip portion 472 and to concentrate magnetic-flux density in the second portion 424 of the gap substantially parallel to a plane of the magnetic-recording disk, for example, similar to each of the magnetic-recording disks 320, 322, 324 and 326 of the disk-stack shown in FIG. 3A, in the HDD 100 in the second portion 424 of the gap. The second pole-tip portion 436 may be configured to receive the second portion of magnetic flux emanating from the third pole-tip portion 472 and to concentrate magnetic-flux density in the second portion 424 of the gap substantially parallel to a plane of the magnetic-recording disk, for example, similar to plane 3B-3B of the magnetic-recording disks 324, in the HDD 100 in the second portion 424 of the gap.

With further reference to FIGS. 4B and 4C, in accordance with an embodiment of the present invention, the pole piece 470 is shaped to concentrate magnetic-flux density in the second portion 424 of the gap substantially parallel to the plane of the magnetic-recording disk, for example, similar to magnetic-recording disk 324 shown in FIG. 3B, in the disk-stack of the hard-disk drive in the second portion 424 of the gap. The bulk eraser 401 further includes a yoke 480 having a first yoke portion 480a and a second yoke portion 480b. The first yoke portion 480a is magnetically coupled with the first magnet 410, the third magnet 460 and the pole piece 470. The second yoke portion 480b is magnetically coupled with the second magnet 430, the third magnet 460 and the pole piece 470. The yoke 480 is configured to suppress stray magnetic flux and to increase magnetic-flux density in the second portion 424 of the gap. Alternative embodiments of the present invention for the yoke that provide further suppression of stray magnetic flux and further increase the magnetic-flux density in the second portion 424 of the gap are shown in FIG. 5 and are next described.

Figure 5:
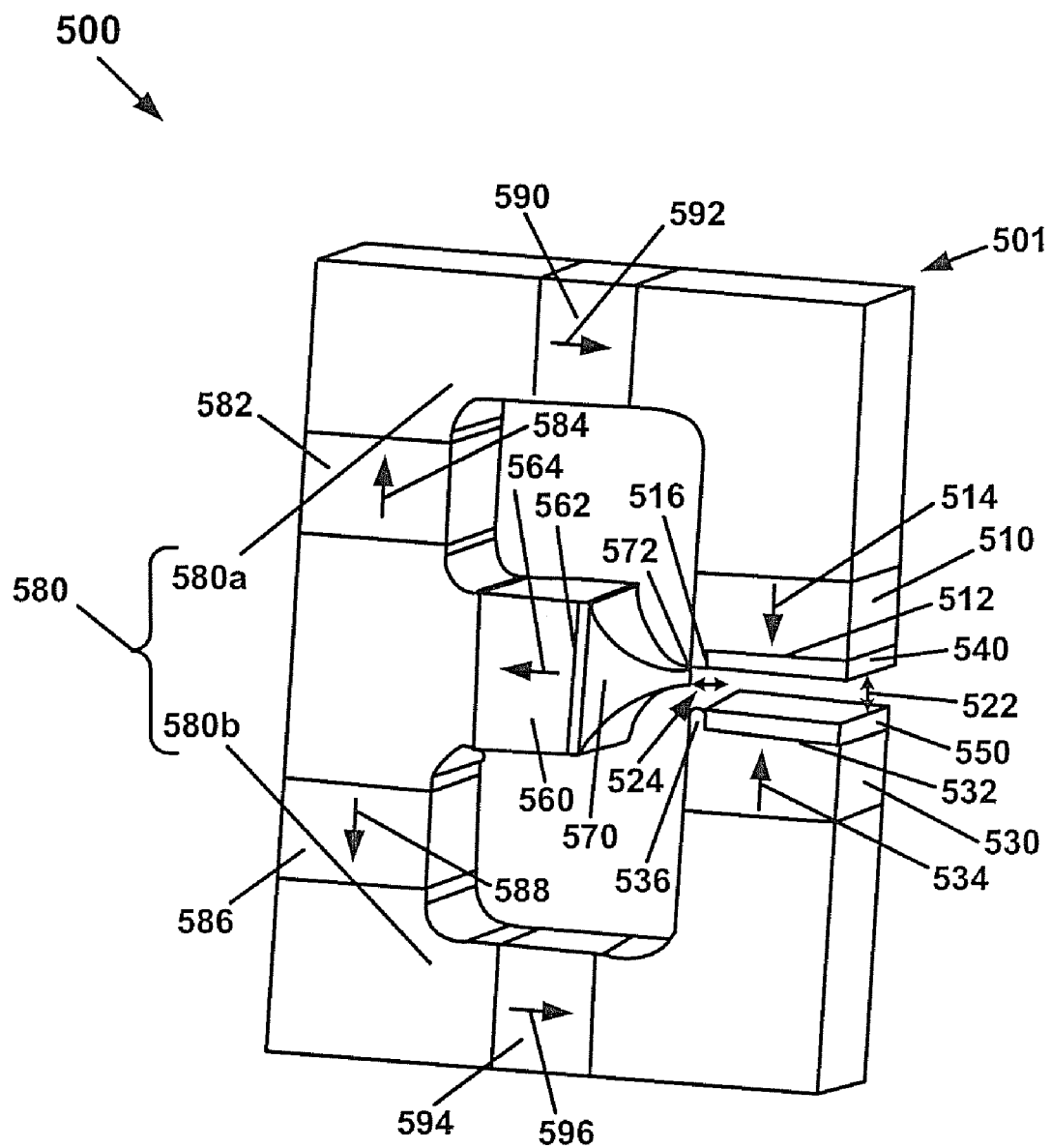
FIG. 5 is a perspective view of an alternative embodiment of a bulk eraser that includes seven magnets and a structure magnetically coupled with the seven magnets to produce magnetic-flux density in a gap sufficient to erase recorded information from a portion of the magnetic-recording disk in a disk-stack of the HDD, in an embodiment of the present invention.

With reference now to FIG. 5, in accordance with an embodiment of the present invention, a perspective view 500 of an alternative embodiment of a bulk eraser 501 is shown. The bulk eraser 501 includes seven magnets 510, 530, 560, 582, 586, 592 and 596 and a structure magnetically coupled with the seven magnets 510, 530, 560, 582, 586, 592 and 596 to produce magnetic-flux density in a gap sufficient to erase recorded information from a portion of the magnetic-recording disk, for example, magnetic-recording disk 120, in a disk-stack of the HDD, for example, HDD 100. The bulk eraser 501 includes a first magnet 510 disposed opposite a second magnet 530 across a first portion 522 of a gap, for example, similar to gap 202 shown in FIG. 2A. The first magnet 510 has a first end pole 512 disposed proximate the first portion 522 of the gap and a first pole-tip portion 516 disposed proximate a second portion 524 of the gap. The second magnet 530 has a second end pole 532 disposed proximate the first portion 522 of the gap and a second pole-tip portion 536 disposed proximate the second portion 524 of the gap. The first and second end poles 512 and 532 have same polarity. The direction 514 of the B-field, the magnetic-flux density, as well as the magnetization field, in the first magnet 510 is shown by the upper arrow in the right leg of the first yoke portion 580a. The upper arrow indicates that a first end pole 512 proximate the first portion 522 of the gap has the polarity of a north pole, and the end pole of the first magnet 510 opposite the north pole has the polarity of a south pole. The arrow also indicates the direction of magnetic flux propagation through the first magnet 510. Similarly, the direction 534 of the B-field, the magnetic-flux density, as well as the magnetization field, in the second magnet 530 is shown by the lower arrow in the right leg of the second yoke portion 580b.

The lower arrow indicates that a second end pole 532 proximate first portion 522 of the gap has the polarity of a north pole, and the end pole of the second magnet 530 opposite the north pole has the polarity of a south pole. The arrow also indicates the direction of magnetic flux propagation through the second magnet 530. The direction 564 of the B-field, the magnetic-flux density, as well as the magnetization field, in the third magnet 560 is shown by the horizontal arrow at the middle of the yoke 580. The horizontal arrow indicates that a third end pole 562 proximate the first portion 522 of the gap has the polarity of a south pole, and the end pole of the third magnet 560 opposite the south pole has the polarity of a north pole. The arrow also indicates the direction of magnetic flux propagation through the third magnet 560.

With further reference to FIG. 5, in accordance with an embodiment of the present invention, the bulk eraser 501 also includes a first magnetic shield 540, which is disposed on the first end pole 512 in proximity to the first portion 522 of the gap, and a second magnetic shield 550, which is disposed on the second end pole 532 in proximity to the first portion 522 of the gap. The bulk eraser 501 also includes a third magnet 560, which is disposed proximate to a second portion 524 of the gap. The third magnet 560 has a third end pole 562, which is disposed proximate the second portion 524 of the gap. The third end pole 562 has a polarity opposite to the first and second end poles 512 and 532. The bulk eraser 501 also includes a pole piece 570, which is disposed on the third end pole 562 in proximity to the second portion 524 of the gap. The pole piece 570 has a third pole-tip portion 572. The first pole-tip portion 516, the second pole-tip portion 536, and the third pole-tip portion 572 define a second portion 524 of the gap located between the first pole-tip portion 516, the second pole-tip portion 536, and the third pole-tip portion 572 and are configured such that magnetic-flux density in the second portion 524 of the gap lies substantially parallel to a plane of the magnetic-recording disk, for example, similar to plane 3B-3B of the magnetic-recording disks 324 as shown in FIG. 3B, in a disk-stack of the hard-disk drive to erase recorded information from a portion on the magnetic-recording disk, for example, similar to the portion of the magnetic-recording disk 324 that lies between contour 370 and the outside perimeter of the magnetic-recording disk 324 as shown in FIG. 3B, when the hard-disk drive is inserted into the second portion 524 of the gap. The first pole-tip portion 516, the second pole-tip portion 536, and the third pole-tip portion 572 are configured such that the magnetic-flux density in the second portion 524 of the gap lies in a substantially radial direction, for example, similar to radial direction 350 as shown in FIG. 3B, of the portion of the magnetic-recording disk of the hard-disk drive. The first pole-tip portion 516, the second pole-tip portion 536, and the third pole-tip portion 572 are configured to suppress magnetic-flux density in a third portion of the gap, for example, similar to the third portion 340 described above for FIGS. 3A and 3B, such that the magnetization of the drive-motor magnet of the drive motor in the hard-disk drive is not degraded when located within the third portion.

With further reference to FIG. 5, in accordance with an embodiment of the present invention, the bulk eraser 501 further includes a yoke 580 having a first yoke portion 580a and a second yoke portion 580b. The first yoke portion 580a is magnetically coupled with the first magnet 510, the third magnet 560 and the pole piece 570. The second yoke portion 580b is magnetically coupled with the second magnet 530, the third magnet 560 and the pole piece 570. The yoke 580 is configured to suppress stray magnetic flux and to increase magnetic-flux density in the second portion 524 of the gap.

The first yoke portion 580a may further include a fourth magnet 582 disposed in and magnetically coupled with the first yoke portion 580a with polarity assisting magnetic-flux circulation in a first magnetic circuit including the first magnet 510, the third magnet 560, the pole piece 570, the second portion 524 of the gap and the first yoke portion 580a including the fourth magnet 582. The direction 584 of the B-field, the magnetic-flux density, as well as the magnetization field, in the fourth magnet 582 is shown by the upper arrow in the left leg of the first yoke portion 580a. The fourth magnet 582 may be composed of a high-field-strength, permanent-magnet material, such as NdFeB. The fourth magnet 582 is configured to suppress stray magnetic flux and to increase magnetic-flux density in the second portion 524 of the gap. The first yoke portion 580a may further include a sixth magnet 590 disposed in and magnetically coupled with the first yoke portion 580a with polarity assisting magnetic-flux circulation in the first magnetic circuit further including the first yoke portion 580a further including the sixth magnet 590. The direction 592 of the B-field, the magnetic-flux density, as well as the magnetization field, in the sixth magnet 590 is shown by the upper arrow in the top leg of the first yoke portion 580a. The sixth magnet 590 may be composed of a high-field-strength, permanent-magnet material, such as NdFeB. The sixth magnet 590 is configured to suppress stray magnetic flux and to increase magnetic-flux density in the second portion 524 of the gap.

With further reference to FIG. 5, in accordance with an embodiment of the present invention, the second yoke portion 580b of the bulk eraser 501 may further include a fifth magnet 586 disposed in and magnetically coupled with the second yoke portion 580b with a polarity assisting magnetic-flux circulation in a second magnetic circuit including the second magnet 530, the third magnet 560, the pole piece 570, the second portion 524 of the gap and the second yoke portion 580b including the fifth magnet 586. The direction 588 of the B-field, the magnetic-flux density, as well as the magnetization field, in the fifth magnet 586 is shown by the lower arrow in the left leg of the second yoke portion 580b. The fifth magnet 586 may be composed of a high-field-strength, permanent-magnet material, such as NdFeB. The fifth magnet 586 is configured to suppress stray magnetic flux and to increase magnetic-flux density in the second portion 524 of the gap. The second yoke portion 580b may further include a seventh magnet 594 disposed in and magnetically coupled with the second yoke portion 580b with polarity assisting magnetic-flux circulation in the second magnetic circuit further including the second yoke portion 580b further including the seventh magnet 594. The direction 596 of the B-field, the magnetic-flux density, as well as the magnetization field, in the seventh magnet 594 is shown by the lower arrow in the bottom leg of the second yoke portion 580b. The seventh magnet 594 may be composed of a high-field-strength, permanent-magnet material, such as NdFeB. They seventh magnet 594 is configured to suppress stray magnetic flux and to increase magnetic-flux density in the second portion 524 of the gap. At least one magnet of the magnets 510, 530, 560, 582, 586, 590 and 592 may be a high-field-strength, permanent magnet, which may be composed of a material such as neodymium iron boron, NdFeB. The grade of the NdFeB material used for at least one magnet of the magnets 510, 530, 560, 582, 586, 590 and 592 may have a grade between about grade 48 and about grade 54; however, a grade of about grade 50 provides a very stable magnet.

With further reference to FIGS. 4A-4C and 5, in accordance with embodiments of the present invention, the bulk eraser includes a first magnet having a first end pole and a first pole-tip portion and a second magnet having a second end pole and a second pole-tip portion such that the first and second magnets are disposed on opposite sides of a first portion of a gap, and such that the first end pole and the second end pole have same polarity. The bulk eraser also includes a third magnet having a third end pole of opposite polarity to the first end pole and the second end pole, and having a pole piece with a third pole-tip portion such that the first pole-tip portion, the second pole-tip portion, and the third pole-tip portion define a second portion of the gap located between the first pole-tip portion, the second pole-tip portion, and the third pole-tip portion. Also, the bulk eraser includes a structure. The structure includes a yoke having a first yoke portion and a second yoke portion. The first yoke portion is magnetically coupled with the first magnet, the third magnet and the pole piece. The first yoke portion further includes a first plurality of magnets disposed in and magnetically coupled with the first yoke portion with a polarity assisting magnetic-flux circulation in a first magnetic circuit including the first magnet, the third magnet, the pole piece, the second portion of the gap and the first yoke portion including the first plurality of magnets. The structure also includes the second yoke portion magnetically coupled with the second magnet the third magnet and the pole piece. The second yoke portion further includes a second plurality of magnets disposed in and magnetically coupled with the second yoke portion with a polarity assisting magnetic-flux circulation in a second magnetic circuit including the second magnet, the third magnet, the pole piece, the second portion of the gap and the second yoke portion including the second plurality of magnets. In accordance with embodiments of the present invention, the structure is configured to suppress stray magnetic flux and to increase magnetic-flux density in the second portion of the gap for erasing recorded information from a portion on the magnetic-recording disk when the hard-disk drive is inserted into the second portion of the gap.

Figure 6:
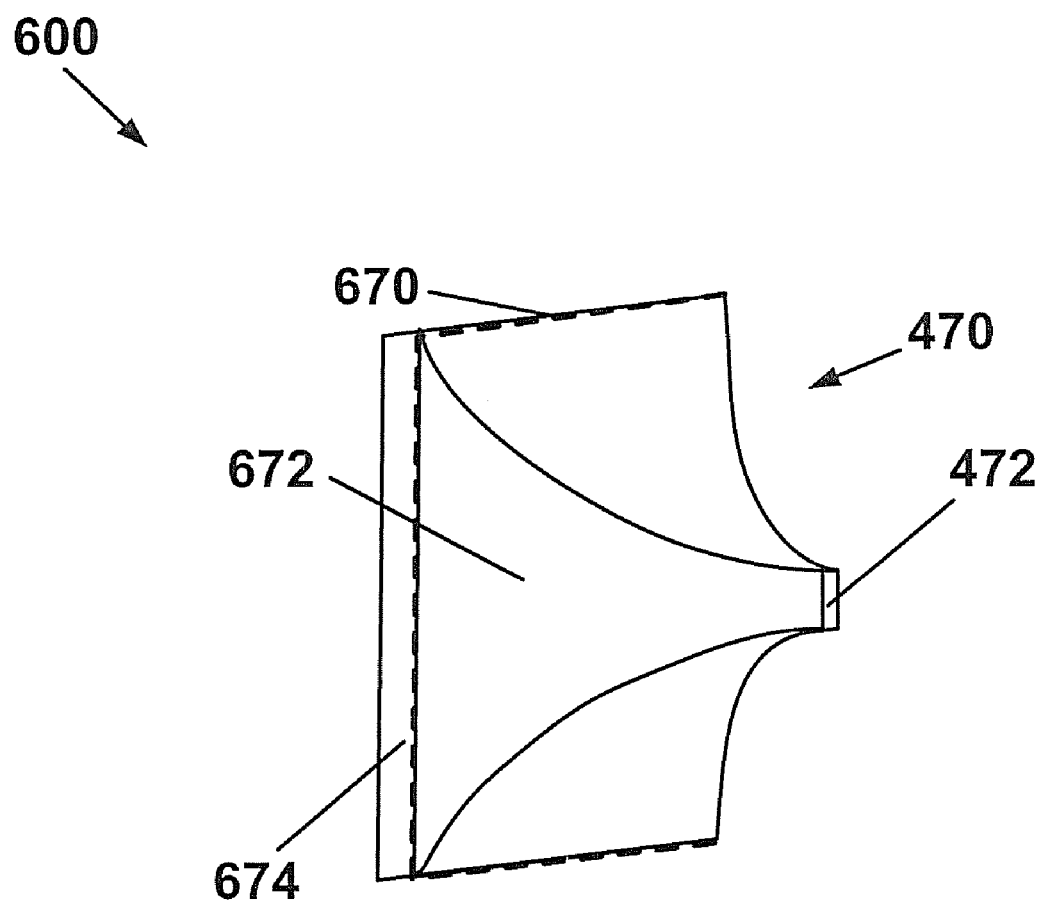
FIG. 6 is a perspective view of the pole piece of the bulk erasers of FIGS. 4A-4C and 5 disposed on a third end pole of a third magnet disposed in proximity to a second portion of the gap for concentrating the magnetic-flux density to erase recorded information from the portion of the magnetic-recording disk in the HDD inserted into the second portion of the gap, in an embodiment of the present invention.

With reference now to FIG. 6, in accordance with an embodiment of the present invention, a perspective view 600 of the pole piece 470 of the bulk eraser 401 of FIGS. 4A-4C, similar to the pole piece 570 of the bulk eraser 501 of FIG. 5, disposed on a third end pole 462 of a third magnet 460 disposed in proximity to the second portion 424 of the gap for concentrating the magnetic-flux density to erase recorded information from the portion of the magnetic-recording disk in the HDD, for example, magnetic-recording disk 120 in HDD 100, inserted into the second portion 424 of the gap. The first pole-tip portion 416, the second pole-tip portion 436, and the third pole-tip portion 472 of the bulk eraser 401 are configured to confine the magnetic-flux density in the second portion 424 of the gap to a region of the magnetic-recording disk sufficiently localized such that strength of eddy currents in the magnetic-recording disk are suppressed when rotating the magnetic-recording disk to erase recorded information on the magnetic-recording disk. The shape of the third pole-tip portion 472 is instrumental in confining the magnetic-flux density in the second portion 424 of the gap to a region of the magnetic-recording disk sufficiently localized such that strength of eddy currents in the magnetic-recording disk are suppressed when rotating the magnetic-recording disk to erase recorded information on the magnetic-recording disk. A narrow third pole-tip portion 472 confines the magnetic-flux density in the second portion 424 of the gap to such a sufficiently localized region of the magnetic-recording disk. The shape of the third pole-tip portion 472 is determined by the shape of the pole piece 470 disposed on the third magnet 460, which is next described. The pole piece 470 has a wide base 670 to provide as much magnetic flux as possible to the yoke 480 and a narrow third pole-tip portion 472 to concentrate the magnetic-flux density in a narrow band about the radial direction, for example, similar to radial direction 350 of FIG. 3B, of the magnetic-recording disk when inserted into the second portion 424 of the gap. A pyramid-like shape can provide these functions as next described.

With further reference to FIG. 6, in accordance with an embodiment of the present invention, the pole piece 470 may include a body selected from the group of bodies consisting of a pyramid, a substantially pyramidally shaped body, a frustum of a rectangular pyramid and a frustum of a substantially pyramidally shaped body having essentially a shape of the frustum of the rectangular pyramid wherein at least one of planar lateral faces of the frustum of the rectangular pyramid is substituted by a concave surface to provide a lateral facing surface 672 of the substantially pyramidally shaped body. A first base 670 of the body is disposed on the third end pole 462 of the third magnet 460, and an apical portion, for example, the third pole-tip portion 472, of the body is disposed proximate the second portion 424 of the gap. As shown in FIG. 6, a plinth portion of the body may be interposed between the first base 670 of the body and the third end pole 462 of the third magnet 460; the plinth portion 674 provides greater mechanical stability in mounting the pole piece 470 on the third end pole 462. The apical portion of a body selected from the group of bodies consisting of the frustum of the rectangular pyramid and the frustum of the substantially pyramidally shaped body may be configured as an apical planar surface of the body. For example, in the case of the frustum of a pyramid, the apical planar surface is provided by a second base of the frustum of the pyramid adjacent to an apex of a pyramid from which the frustum of the pyramid is derived. The apical portion of the body is elongated in a direction perpendicular to the plane of the magnetic-recording disk to spread magnetic-flux density uniformly over a plurality of planes of a plurality of magnetic-recording disks in the disk-stack of the hard-disk drive in the second portion 424 of the gap. Thus, at least three magnets 410, 430 and 460 and the structure including the third pole-tip portion 472 of the pole piece 470 are configured to produce magnetic-flux density such that the magnetic-flux density is applied to a localized portion of the magnetic-recording disk, aided by the narrow width of the third pole-tip portion 472, to suppress eddy currents in the magnetic-recording disk of the HDD 100, as previously described above.

Figure 7:
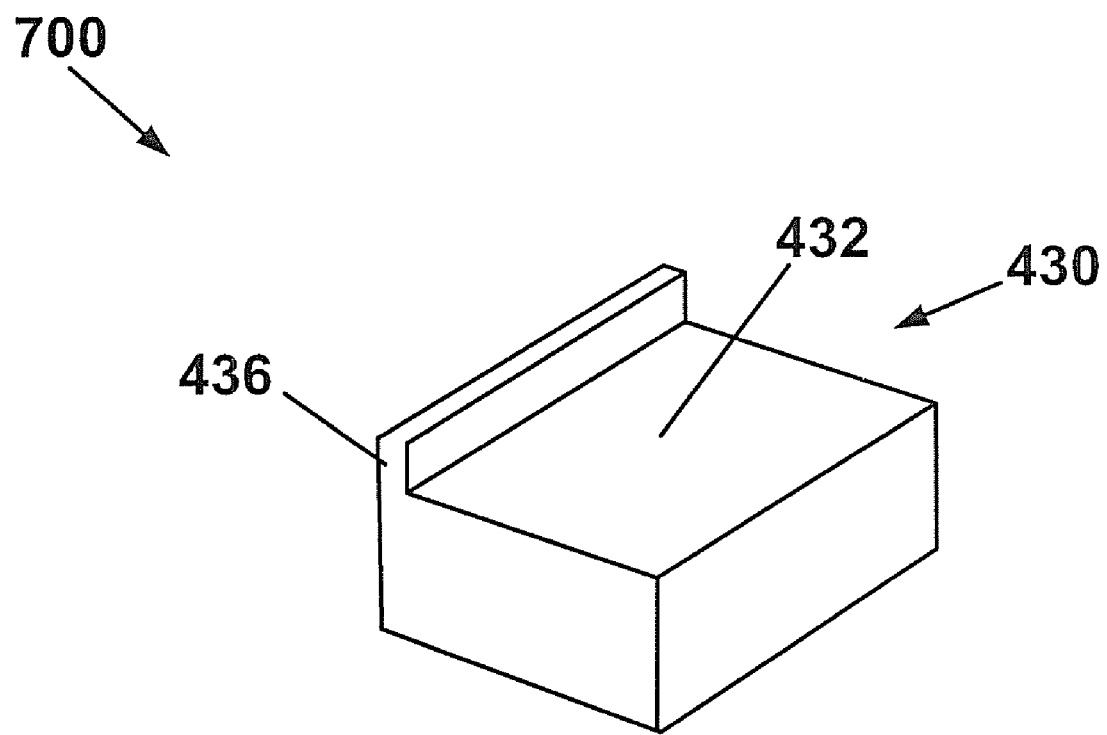
FIG. 7 is a perspective view of the second magnet of the bulk eraser of FIGS. 4A-4C and 5 disposed in proximity to a first portion of the gap and a second pole-tip portion of the second magnet disposed proximate a second portion of the gap for concentrating the magnetic-flux density to erase recorded information from the portion of the magnetic-recording disk in the HDD inserted into the second portion of the gap, in an embodiment of the present invention.

With reference now to FIG. 7, in accordance with an embodiment of the present invention, a perspective view 700 of the second magnet 430 of the bulk eraser 401 of FIGS. 4A-4C, similar to the second magnet 530 of the bulk eraser 501 of FIG. 5, is shown. FIG. 7 shows a detailed view of the second magnet 430 of the bulk eraser 401, which is disposed in proximity to a first portion 422 of the gap, and the second pole-tip portion 436 of the second magnet 430, which is disposed proximate the second portion 424 of the gap for concentrating the magnetic-flux density to erase recorded information from the portion of the magnetic-recording disk in the HDD, for example, magnetic-recording disk 120 of HDD 100, when inserted into the second portion 424 of the gap. As shown in FIG. 7, the second magnet 430 has a second end pole 432 and that in conjunction with the second pole-tip portion 436 forms a pocket in which second magnetic shield 450 is disposed. The first magnet 410 has a first end pole 412 that forms a similar pocket in which the first magnetic shield 440 is disposed. The first magnetic shield 440 and the second magnetic shield 450 may be composed of a high magnetic-permeability material. Moreover, the first magnetic shield 440 and the second magnetic shield 450 may be composed of a material selected from the group consisting of low-carbon steel, such as Hyperco Steel, permalloy and supermalloy. The magnetic shields 440 and 450 provide greater protection for the drive-motor magnet disposed in the first portion 422 of the gap by directing magnetic flux away from the drive-motor magnet. Thus, the magnetic-flux density produced by the at least three magnets 410, 430 and 460 and the structure, including the first magnetic shield 440 in the second magnetic shield 450, is configured to erase recorded information from the magnetic-recording disk, for example, similar to magnetic-recording disk 324, disposed in the second portion 424 of the gap without degrading the magnetization of a drive-motor magnet, for example, similar to drive-motor magnets 330 and 334, in the drive motor disposed in the third portion of the gap, for example, similar to the third portion 340 described above for FIGS. 3A and 3B. The intensity of a field component of the magnetic-flux density directed along the radial direction, for example, similar to radial direction 350, in the plane of the magnetic-recording disk, for example, similar to magnetic-recording disk 324, produced by the at least three magnets 410, 430 and 460 and the structure has a gradient as a function of distance along the radial direction at a transition region, similar to the transition region described above for FIG. 3B, between the second portion 424 of the gap and the third portion, for example, similar to the third portion 340 described above for FIGS. 3A and 3B, of the gap such that the gradient allows erasing recorded information from the magnetic-recording disk in close proximity to the drive-motor magnet, for example, similar to drive-motor magnets 330 and 334, in the drive motor without degrading the magnetization of the drive-motor magnet in the drive motor. Modeling results for the gradient in the magnetic-flux density at the transition region in an alternative embodiment of the present invention, which utilizes five magnets, are next described.

Figure 8:
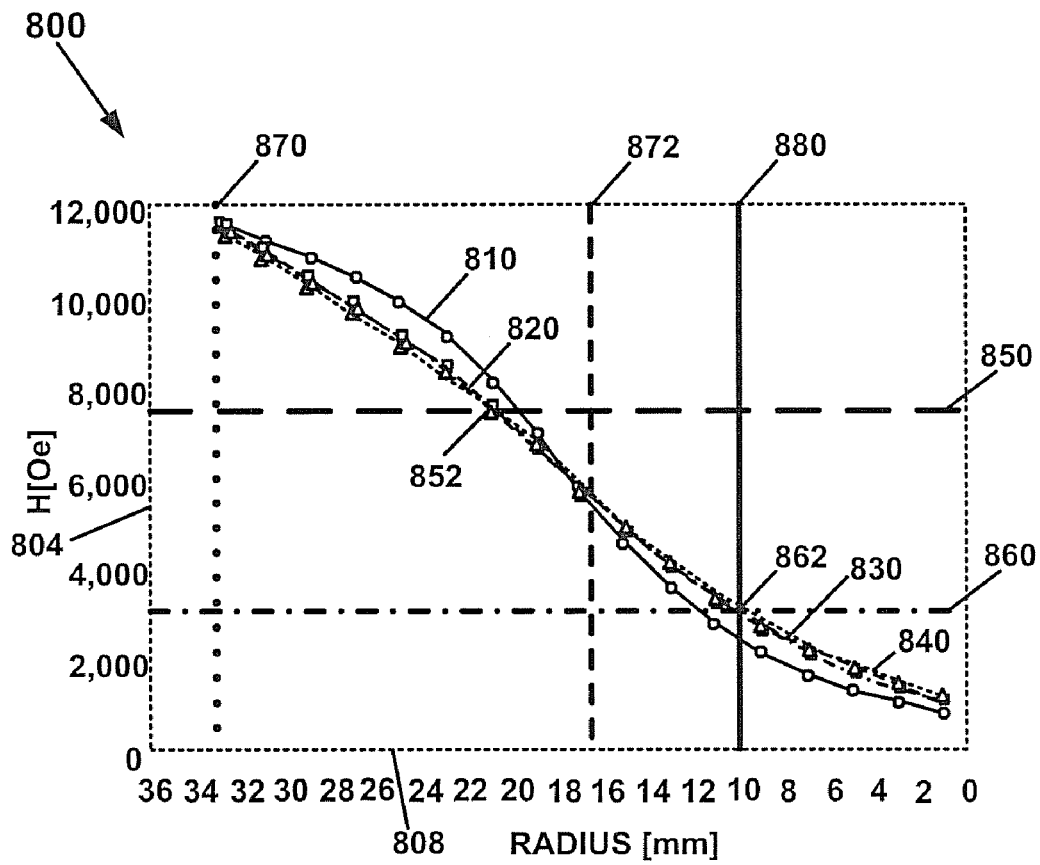
FIG. 8 is a plot of the intensities of the magnetic field intensity (magnetic-flux density) as a function of radial distance from center of a disk in the plane of each of four magnetic-recording disks in a disk-stack of a HDD inserted into the second portion of the gap of a bulk eraser configured with five magnets to erase recorded information from the magnetic-recording disk in a disk-stack of an HDD in the second portion of the gap, in an embodiment of the present invention.

With reference now to FIG. 8, in accordance with an embodiment of the present invention, a plot 800 of the intensities of the magnetic field intensity as a function of radial distance from center of a disk in the plane of each of four magnetic-recording disks in a disk-stack of a HDD inserted into the second portion of the gap of a bulk eraser is shown. The bulk eraser is configured with five magnets, similar to magnets 510, 530, 560, 582 and 586 of the bulk eraser 501 of FIG. 5, to erase recorded information from magnetic-recording disks in a disk-stack of an HDD in the second portion of the gap, similar to the second portion 524 of the gap of the bulk eraser 501. Ordinate 804 of the plot 800 of the intensities of the magnetic field intensity (magnetic-flux density) is given in units of Oersteds (Oe) to erase a magnetic-recording disk. Abscissa 808 of the plot 800 is given in units of millimeters (mm) of disk radius. The direction of the abscissa 808 is from right to left rather than left to right to facilitate comparison with the earlier plots of the distribution of magnetic field intensity (magnetic-flux density) of FIGS. 3A and 3B. The location of the OD of the disk along the radius of the magnetic-recording disk is indicated by the vertical line 870. The location of the ID of the disk along the radius of the magnetic-recording disk is indicated by the vertical line 872. The location of the OD of the drive motor along the radius of the magnetic-recording disk is indicated by the vertical line 880. The erase field necessary to erase recorded information from the magnetic-recording disk is indicated by the horizontal line 850, which is approximately 7500 Oe. The critical field to degrade the magnetization of a drive-motor magnet is indicated by the horizontal line 860, which is approximately 3000 Oe.

With further reference to FIG. 8, in accordance with an embodiment of the present invention, four plots 810, 820, 830 and 840, one for each of four disks in a disk-stack, are given for the magnitude of the magnetic-flux-density vector along a radial direction of the magnetic-recording disk in the HDD that is oriented substantially parallel to the central flux-propagation direction in the bulk eraser. Plot 810 is for disk 1 in the disk-stack; plot 820 is for disk 2 in the disk-stack; plot 830 is for disk 3 in the disk-stack; and, plot 840 is for disk 4 in the disk-stack. Each of the plots 810, 820, 830 and 840 shows the behavior of the magnitude of the magnetic-flux-density vector along the radial direction as a function of distance from the center of each of the disks: disk 1, disk 2, disk 3 and disk 4, respectively. As shown in FIG. 8, each of the plots 810, 820, 830 and 840 crosses the horizontal line 850 corresponding to the erase field necessary to erase recorded information from the magnetic-recording disk at about a radius of 21 mm. Therefore, any portion of the magnetic-recording disk greater than a radius of 21 mm will be erased. Thus, the radius of 21 mm corresponds roughly to the location of a contour in the magnitude of the magnetic-flux-density vector similar to contour 370 shown in FIG. 3B. On the other hand, any portion of the magnetic-recording disk less than a radius of 21 mm will not be erased. Therefore, the region between where each of the plots 810, 820, 830 and 840 crosses the horizontal line 850, at about 21 mm, and the vertical line 880, which designates the location of the OD of the drive motor, corresponds roughly to the transition region in the gap, similar to the transition region in the gap shown in FIG. 3B.

With further reference to FIG. 8, in accordance with an embodiment of the present invention, it is desirable to make the transition region as small as possible to minimize the amount of time required to erase portions of a disk that lie between the crossing of the plots 810, 820, 830 and 840, at about 21 mm, and the vertical line 872 corresponding to the ID of a disk. This can be accomplished by making the gradient of the magnetic-flux density as a function of radius as great as possible in this transition region, which can be effectuated by making the magnetic-flux density in the erasing region greater than 21 mm as high as possible while minimizing the magnetic-flux density at the location of the drive motor. Moreover, as shown in FIG. 8, the plots 810, 820, 830 and 840 cross the horizontal line 860 corresponding to the critical field for degrading the magnetization of drive-motor magnets at about 10 mm. Thus, to erase the maximum portion of the disks, it is desirable to employ a stroke length that brings the OD of the motor right up to the crossing point where the plots cross the horizontal line 860 corresponding to the critical field for degrading the magnetization of the drive-motor magnets. In accordance with embodiments of the present invention, the intensity of a field component of the magnetic-flux density directed along the radial direction in the plane of the magnetic-recording disk produced by five magnets, similar to magnets 510, 530, 560, 582 and 586, and the structure has a gradient as a function of distance along the radial direction at a transition region, similar to the transition region described above for FIG. 3B, between the second portion of the gap and the third portion of the gap such that the gradient allows erasing recorded information from the magnetic-recording disk in close proximity to the drive-motor magnet, for example, similar to drive-motor magnets 330 and 334, in the drive motor without degrading the magnetization of the drive-motor magnet in the drive motor. Similarly, as shown by the modeling results of FIG. 8, the first pole-tip portion, the second pole-tip portion, and the third pole-tip portion of the bulk eraser utilizing the five magnets, similar to magnets 510, 530, 560, 582 and 586 of bulk eraser 501, are configured to suppress magnetic-flux density in a third portion of the gap such that the magnetization of the drive-motor magnet of the drive motor in the hard-disk drive is not degraded when located within the third portion.

Figure 9B:
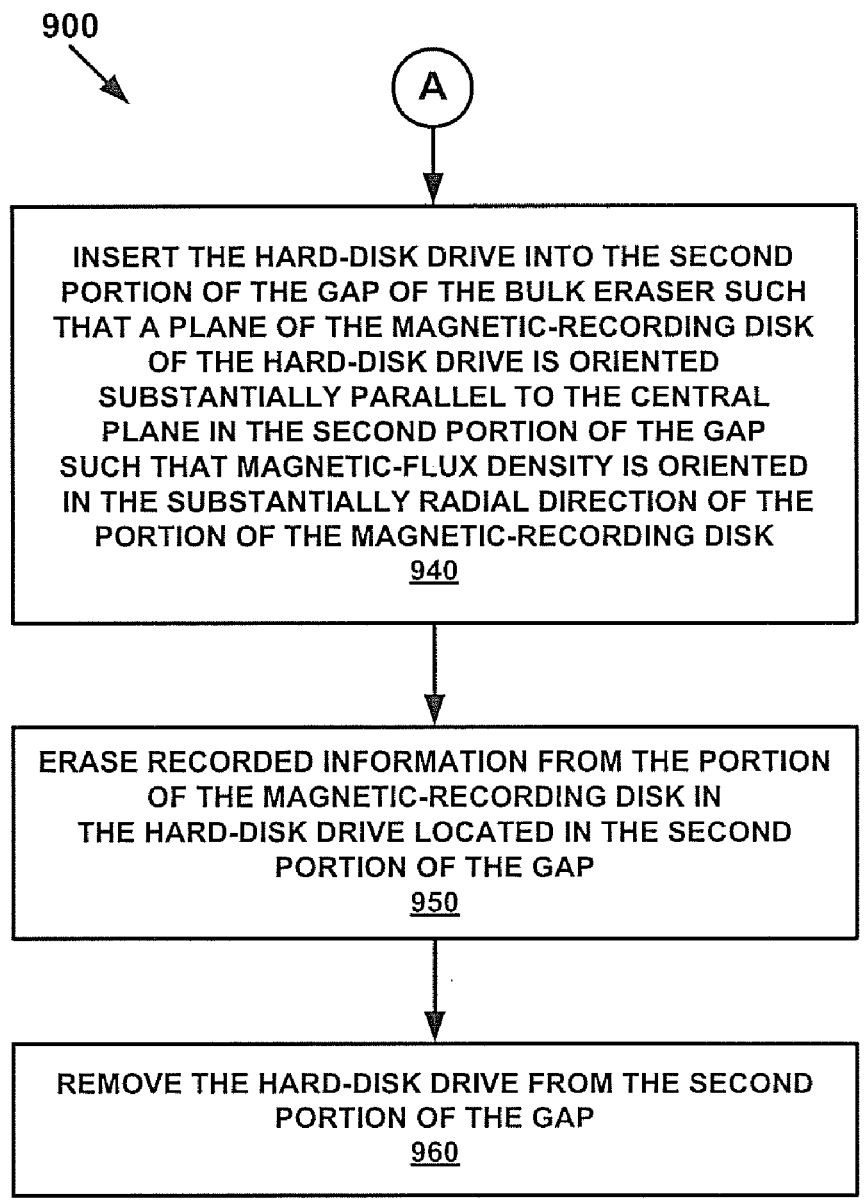
FIG. 9B is a continuation of the flow chart of FIG. 9A illustrating a method of manufacturing of a hard-disk drive using a bulk eraser for erasing recorded information on a magnetic-recording disk, in an embodiment of the present invention.

Description of Embodiments of the Present Invention for a Method of Manufacturing of a Hard-Disk Drive Using a Bulk Eraser for Erasing Recorded Information on a Magnetic-Recording Disk With reference now to FIGS. 9A and 9B, in accordance with an embodiment of the present invention, a flow chart 900 illustrates the method of manufacturing of a HDD using a bulk eraser for erasing recorded information on a magnetic-recording disk. At 910, a bulk eraser that produces magnetic-flux density in a second portion of a gap sufficient to erase recorded information from a portion of the magnetic-recording disk, a HDD having an enclosure, a disk-stack having at least one magnetic-recording disk rotatably mounted on a spindle, and a drive motor having a rotor attached to the spindle for rotating the magnetic-recording disk inside the enclosure are provided. At 920, a plurality of magnets and a structure of the bulk eraser are configured such that magnetic-flux density is oriented substantially parallel to a central plane in the second portion of the gap and in a substantially radial direction of the portion of the magnetic-recording disk when the HDD is inserted into the second portion of the gap. At 930, the magnetic-recording disk is rotated in the HDD. At 940, the HDD is inserted into the second portion of the gap of the bulk eraser such that a plane of the magnetic-recording disk of the HDD is oriented substantially parallel to the central plane in the second portion of the gap such that magnetic-flux density is oriented in the substantially radial direction of the portion of the magnetic-recording disk. At 950, recorded information is erased from the portion of the magnetic-recording disk in the HDD located in the second portion of the gap. At 960, the HDD is removed from the second portion of the gap.

With reference now to FIG. 10, in accordance with an embodiment of the present invention, a flow chart 1000 illustrates further embodiments of the present invention for a method of manufacturing of a HDD using a bulk eraser for erasing recorded information on a magnetic-recording disk. At 1010, pole pieces of the structure and pole-tip portions of the pole pieces are configured such that magnetic-flux density in the second portion of the gap is oriented substantially parallel to a central flux-propagation direction in the second portion of the gap. At 1020, the magnetic-recording disk in the HDD is oriented such that a radial direction of the portion of the magnetic-recording disk is oriented substantially parallel to the central flux-propagation direction in the second portion of the gap.

With reference now to FIG. 11, in accordance with an embodiment of the present invention, a flow chart 1100 illustrates further embodiments of the present invention for a method of manufacturing of a HDD using a bulk eraser for erasing recorded information on a magnetic-recording disk. At 1110, the HDD is inserted into the second portion of the gap with an insertion speed that is sufficient to assure complete erasure of recorded information on the magnetic-recording disk in the HDD. At 1120, the insertion of the hard disk drive into the second portion of the gap is such that an insertion speed into the gap is less than or equal to 1 centimeter per second.

With reference now to FIG. 12, in accordance with an embodiment of the present invention, a flow chart 1200 illustrates further embodiments of the present invention for a method of manufacturing of a HDD using a bulk eraser for erasing recorded information on a magnetic-recording disk. At 1210, the HDD is removed from the second portion of the gap with a speed that is sufficient to assure complete erasure of recorded information on the magnetic-recording disk in the HDD. At 1220, the removal of the hard disk drive from the second portion of the gap is such that the removal speed from the gap is less than or equal to 1 centimeter per second.

With reference now to FIG. 13, in accordance with an embodiment of the present invention, a flow chart 1300 illustrates further embodiments of the present invention for a method of manufacturing of a HDD using a bulk eraser for erasing recorded information on a magnetic-recording disk. At 1310, the magnetic-recording disk in the HDD is rotated with the drive motor at a rotation speed that is sufficient to assure complete erasure of recorded information on the magnetic-recording disk in the HDD without stalling the drive motor. At 1320, the rotation of the magnetic-recording disk in the hard disk drive is such that the rotation speed of the magnetic-recording disk is less than or equal to 2 Hertz.

Figure 14:
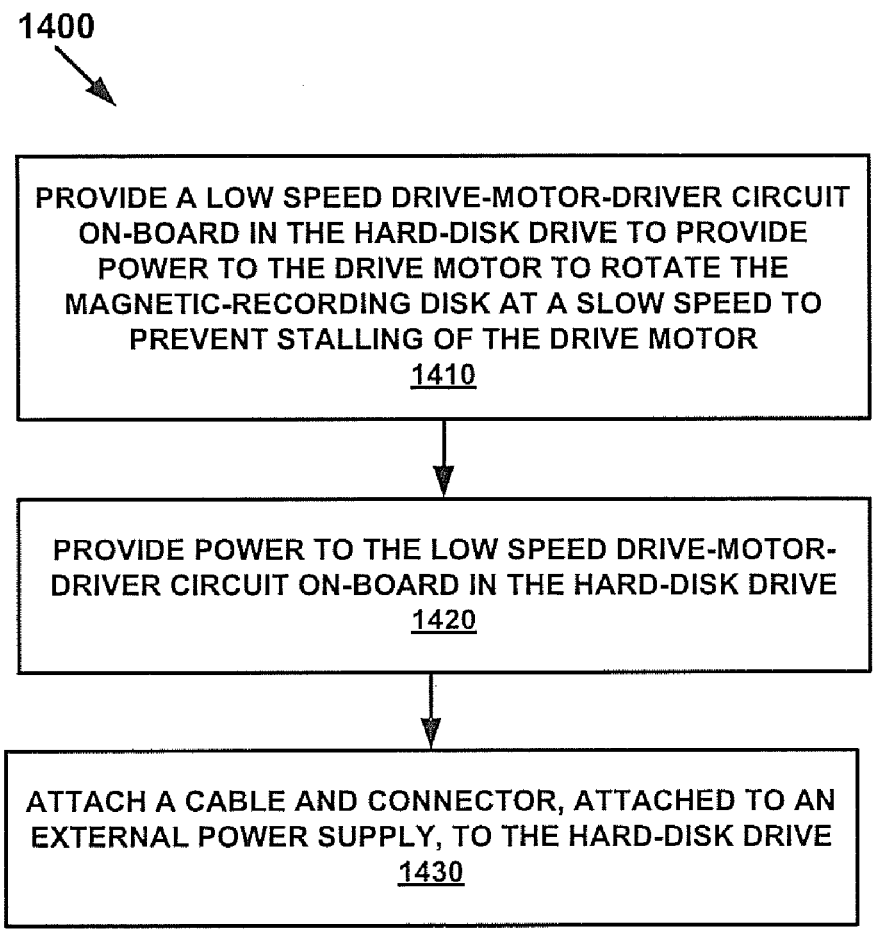
FIG. 14 is a flow chart illustrating further embodiments of the present invention for a method of manufacturing of a hard-disk drive using a bulk eraser for erasing recorded information on a magnetic-recording disk, in an embodiment of the present invention.

With reference now to FIG. 14, in accordance with an embodiment of the present invention, a flow chart 1400 illustrates further embodiments of the present invention for a method of manufacturing of a HDD using a bulk eraser for erasing recorded information on a magnetic-recording disk. At 1410, a low speed drive-motor-driver circuit is provided on-board in the HDD to provide power to the drive motor to rotate the magnetic-recording disk at a slow speed to prevent stalling of the drive motor. At 1420, power is provided to the low speed drive-motor-driver circuit on-board in the HDD. At 1430, the power provided is such that a cable and connector, attached to an external power supply, is attached to the HDD.

With reference now to FIG. 15, in accordance with an embodiment of the present invention, a flow chart 1500 illustrates further embodiments of the present invention for a method of manufacturing of a HDD using a bulk eraser for erasing recorded information on a magnetic-recording disk. At 1510, the second portion of the gap is provided with sufficient clearance to accommodate the HDD upon inserting and removing the HDD from the second portion of the gap. At 1520, the clearance in the second portion of the gap is such that the clearance of the second portion of the gap is less than or equal to about 2.6 centimeters.

Figure 16:
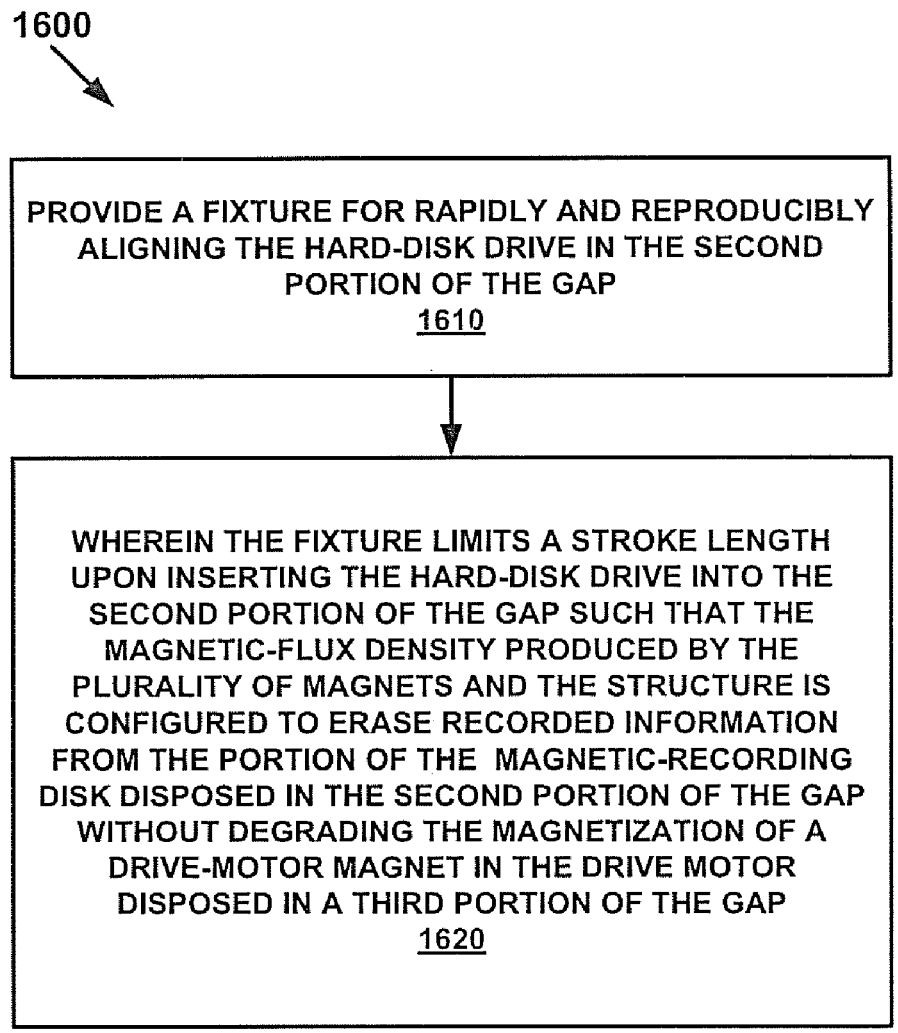
FIG. 16 is a flow chart illustrating further embodiments of the present invention for a method of manufacturing of a hard-disk drive using a bulk eraser for erasing recorded information on a magnetic-recording disk, in an embodiment of the present invention.

With reference now to FIG. 16, in accordance with an embodiment of the present invention, a flow chart 1600 illustrates further embodiments of the present invention for a method of manufacturing of a HDD using a bulk eraser for erasing recorded information on a magnetic-recording disk. At 1610, a fixture is provided for rapidly and reproducibly aligning the HDD in the second portion of the gap. At 1620, the fixture is such that the fixture limits a stroke length upon inserting the HDD into the second portion of the gap such that the magnetic-flux density produced by the plurality of magnets and the structure is configured to erase recorded information from the portion of the magnetic-recording disk disposed in the second portion of the gap without degrading the magnetization of a drive-motor magnet in the drive motor disposed in a third portion of the gap.

Figure 17:
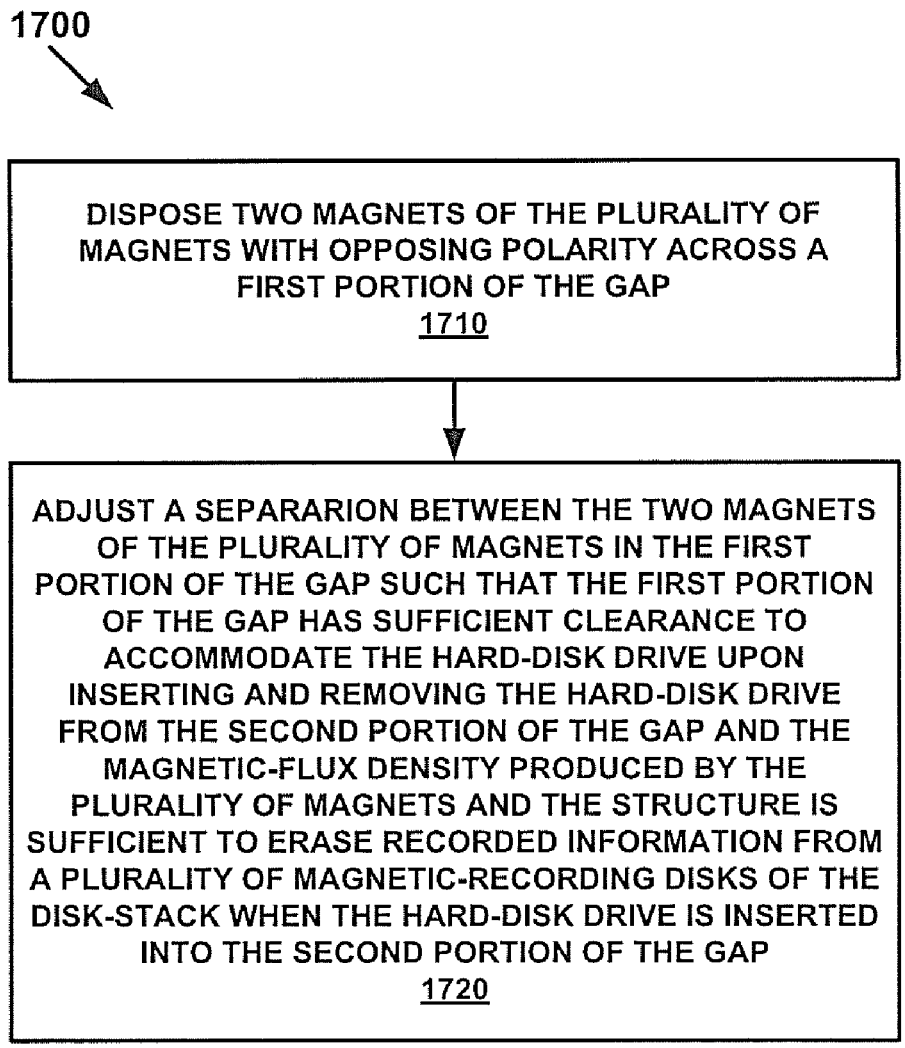
FIG. 17 is a flow chart illustrating further embodiments of the present invention for a method of manufacturing of a hard-disk drive using a bulk eraser for erasing recorded information on a magnetic-recording disk, in an embodiment of the present invention.

With reference now to FIG. 17, in accordance with an embodiment of the present invention, a flow chart 1700 illustrates further embodiments of the present invention for a method of manufacturing of a HDD using a bulk eraser for erasing recorded information on a magnetic-recording disk. At 1710, two magnets of the plurality of magnets are disposed with opposing polarity across a first portion of the gap. At 1720, a separation between the two magnets of the plurality of magnets in the first portion of the gap is adjusted such that the first portion of the gap has sufficient clearance to accommodate the HDD upon inserting and removing the HDD from the second portion of the gap and the magnetic-flux density produced by the plurality of magnets and the structure is sufficient to erase recorded information from a plurality of magnetic-recording disks of the disk-stack when the HDD is inserted into the second portion of the gap.

Figure 18B:
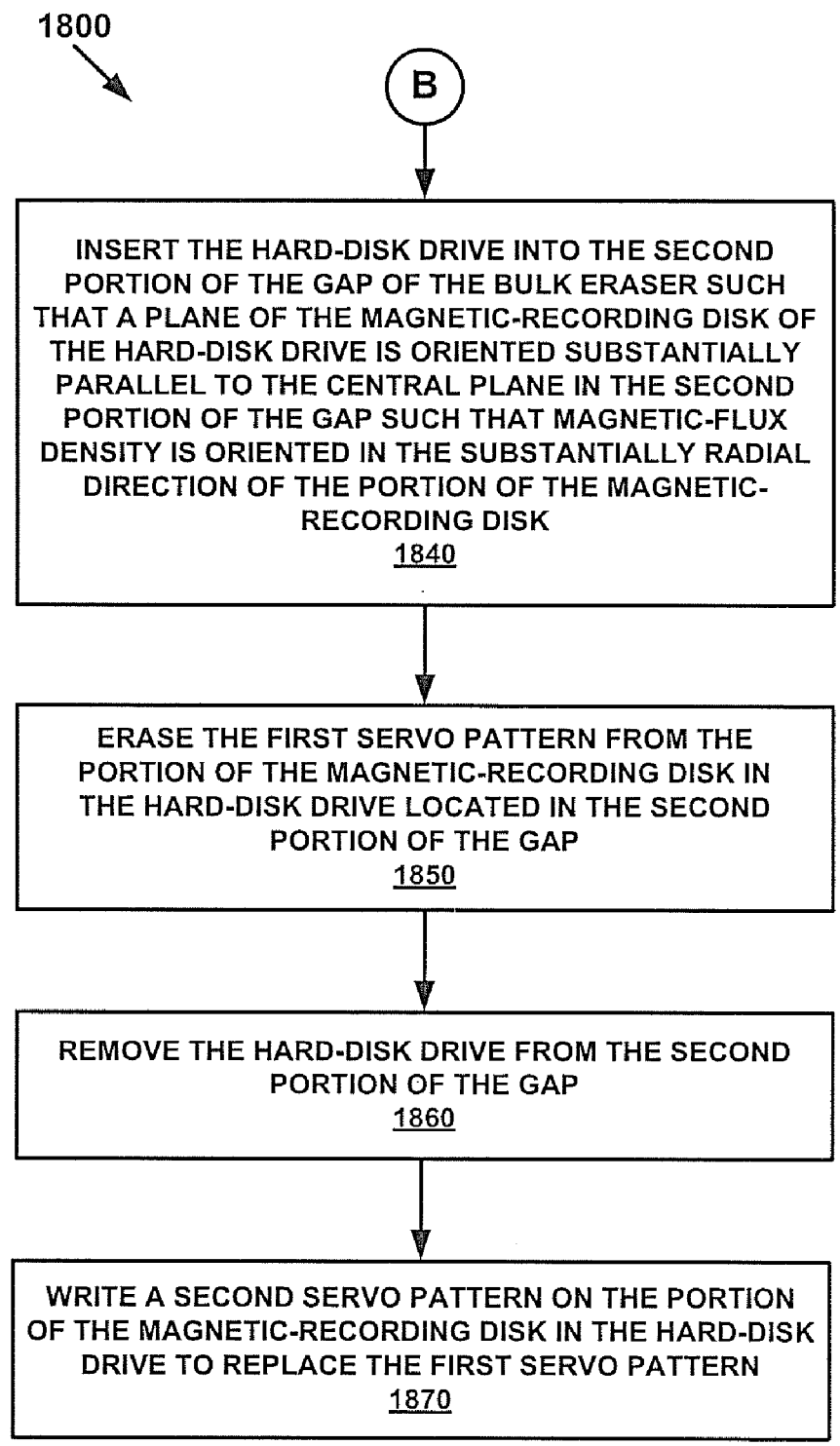
FIG. 18B is a continuation of the flow chart of FIG. 20A illustrating a method of reworking a hard-disk drive in manufacturing the hard-disk drive using a bulk eraser for erasing a servo pattern on a magnetic-recording disk, in an embodiment of the present invention.

With reference now to FIGS. 18A and 18B, in accordance with an embodiment of the present invention, a flow chart 1800 illustrates the method of reworking a HDD in manufacturing the HDD using a bulk eraser for erasing a servo pattern on a magnetic-recording disk. At 1810, a bulk eraser that produces magnetic-flux density in a second portion of a gap sufficient to erase a first servo pattern from a portion of the magnetic-recording disk, a HDD having an enclosure, a disk-stack having at least one magnetic-recording disk rotatably mounted on a spindle, and a drive motor having a rotor attached to the spindle for rotating the magnetic-recording disk inside the enclosure are provided. At 1820, a plurality of magnets and a structure of the bulk eraser are configured such that magnetic-flux density is oriented substantially parallel to a central plane in the second portion of the gap and in a substantially radial direction of the portion of the magnetic-recording disk when the HDD is inserted into the second portion of the gap. At 1830, the magnetic-recording disk is rotated in the HDD. At 1840, the HDD is inserted into the second portion of the gap of the bulk eraser such that a plane of the magnetic-recording disk of the HDD is oriented substantially parallel to the central plane in the second portion of the gap such that magnetic-flux density is oriented in the substantially radial direction of the portion of the magnetic-recording disk. At 1850, the first servo pattern is erased from the portion of the magnetic-recording disk in the HDD located in the second portion of the gap. At 1860, the HDD is removed from the second portion of the gap. At 1870, a second servo pattern is written on the magnetic-recording disk in the HDD to replace the first servo pattern.

Figure 19A:
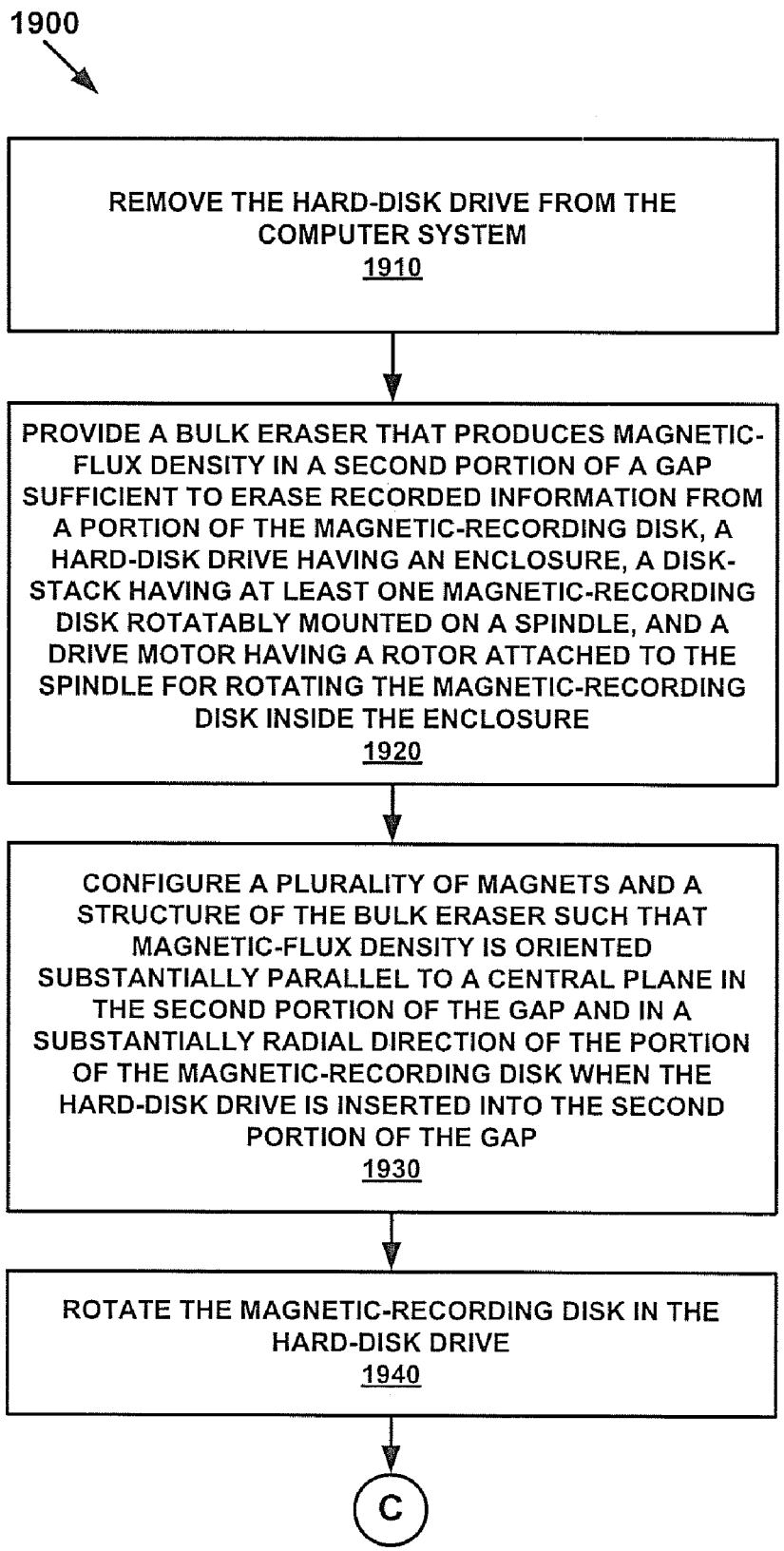
FIG. 19A is a flow chart illustrating a method of preserving security of recorded information in a hard-disk drive in a computer system using a bulk eraser, in an embodiment of the present invention.
Figure 19B:
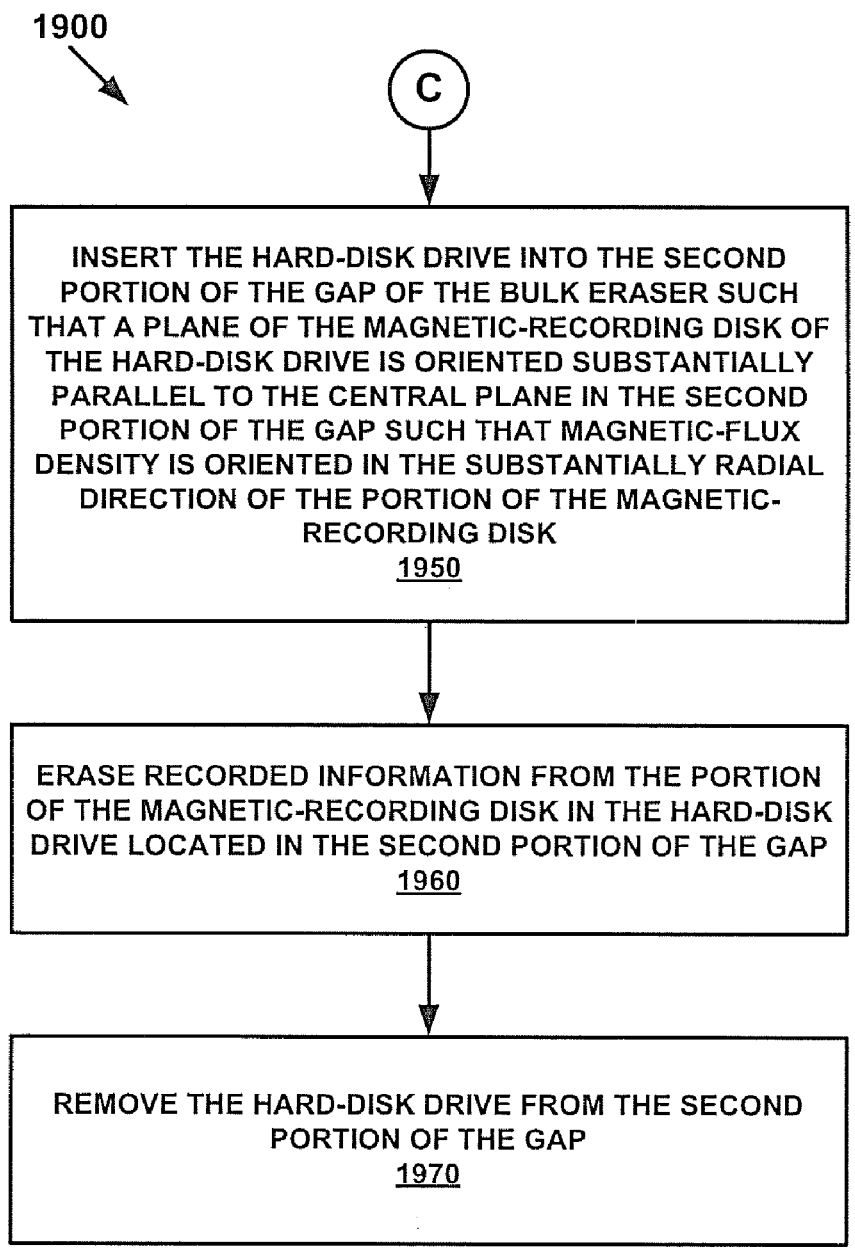
FIG. 19B is a continuation of the flow chart of FIG. 21A illustrating a method of manufacturing of preserving security of recorded information in a hard-disk drive in a computer system using a bulk eraser, in an embodiment of the present invention.

With reference now to FIGS. 19A and 19B, in accordance with an embodiment of the present invention, a flow chart 1900 illustrates the method of preserving security of recorded information in a HDD in a computer system using a bulk eraser. At 1910, the HDD is removed from the computer system. At 1920, a bulk eraser that produces magnetic-flux density in a second portion of a gap sufficient to erase recorded information from a portion of the magnetic-recording disk, a HDD having an enclosure, a disk-stack having at least one magnetic-recording disk rotatably mounted on a spindle, and a drive motor having a rotor attached to the spindle for rotating the magnetic-recording disk inside the enclosure are provided. At 1930, a plurality of magnets and a structure of the bulk eraser are configured such that magnetic-flux density is oriented substantially parallel to a central plane in the second portion of the gap and in a substantially radial direction of the portion of the magnetic-recording disk when the HDD is inserted into the second portion of the gap. At 1940, the magnetic-recording disk is rotated in the HDD. At 1950, the HDD is inserted into the second portion of the gap of the bulk eraser such that a plane of the magnetic-recording disk of the HDD is oriented substantially parallel to the central plane in the second portion of the gap such that magnetic-flux density is oriented in the substantially radial direction of the portion of the magnetic-recording disk. At 1960, recorded information is erased from the portion of the magnetic-recording disk in the HDD located in the second portion of the gap. At 1970, the HDD is removed from the second portion of the gap.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It may be intended that the scope of the invention be defined by the claims appended hereto and their equivalents.

What is claimed is:

1. A bulk eraser for erasing recorded information on a magnetic-recording disk, said bulk eraser comprising:
    a plurality of magnets comprising:
        a first magnet at a top portion of an E-shaped structure;
        a second magnet at a bottom portion of the E-shaped structure; and
        a third magnet at a mid-portion of the E-shaped structure; and
    a structure magnetically coupled with said plurality of magnets to produce magnetic-flux density in a gap, wherein said gap has a first portion, a second portion and a third portion and wherein two magnets are disposed with opposing polarity across said first portion of said gap;
    wherein said plurality of magnets and said structure are configured to produce a magnetic-flux density in said second portion of said gap sufficient to erase recorded information from a portion of at least one magnetic-recording disk in a disk-stack of said hard-disk drive when said hard-disk drive is inserted into said second portion of said gap; and
    wherein said plurality of magnets and said structure are configured to direct said magnetic-flux density in a substantially radial direction of said portion of said magnetic-recording disk in said hard-disk drive in said second portion of said gap.

2. The bulk eraser of claim 1, wherein said plurality of magnets and said structure are configured to produce a magnetic-flux density sufficient to erase recorded information from portions of a plurality of magnetic-recording disks in a disk-stack of said hard-disk drive.

3. The bulk eraser of claim 1, wherein said plurality of magnets and said structure are configured to erase recorded information from a perpendicular-magnetic-recording disk.

4. The bulk eraser of claim 1, wherein said plurality of magnets and said structure are configured to produce said magnetic-flux density such that said magnetic-flux density is applied to a localized portion of said magnetic-recording disk to suppress eddy currents in said magnetic-recording disk of said hard-disk drive.

5. The bulk eraser of claim 1, wherein said magnetic-flux density produced by said plurality of magnets and said structure is configured to erase recorded information from said magnetic-recording disk disposed in said second portion of said gap without degrading magnetization of a drive-motor magnet in said drive motor disposed in said third portion of said gap.

6. The bulk eraser of claim 5, wherein intensity of a field component of said magnetic-flux density directed along said radial direction in said plane of said magnetic-recording disk produced by said plurality of magnets and said structure has a gradient as a function of distance along said radial direction at a transition region between said second portion of said gap and said third portion of said gap such that said gradient allows erasing recorded information from said magnetic-recording disk in close proximity to said drive-motor magnet in said drive motor without degrading magnetization of said drive-motor magnet in said drive motor.

7. The bulk eraser of claim 1, wherein said magnets are composed of NdFeB.

8. The bulk eraser of claim 1, wherein said plurality of magnets are configured to produce a magnetic-flux density sufficient to erase recorded information from a portion of at least one magnetic-recording disk containing servo information in a disk-stack of said hard-disk drive.

9. The bulk eraser of claim 1, wherein said plurality of magnets are configured to produce a magnetic-flux density sufficient to erase recorded data from a portion of at least one magnetic-recording disk containing recorded data in a disk-stack of said hard-disk drive to preserve security of said recorded data.

10. A bulk eraser for erasing recorded information on a magnetic-recording disk in a hard-disk drive, said bulk eraser comprising:
a first source of magnetic flux disposed at a top portion of a gap in an E-shaped structure;
a second source of magnetic flux disposed at a bottom portion of the gap in the E-shaped structure; and
a third source of magnetic flux disposed at a mid-portion of the gap in the E-shaped structure, said first source having a first end pole disposed proximate said first portion of said gap, and said second source having a second end pole disposed proximate said first portion of said gap, wherein said first and second end poles have a same polarity;
a first pole piece disposed on said first end pole in proximity to said first portion of said gap, said first pole piece having a first pole-tip portion;
a second pole piece disposed on said second end pole in proximity to said first portion of said gap, said second pole piece having a second pole-tip portion; and
a third pole piece disposed proximate to a second portion of said gap, said third pole piece having a third pole-tip portion;
wherein said first pole-tip portion, said second pole-tip portion, and said third pole-tip portion define said second portion of said gap located between said first pole-tip portion, said second pole-tip portion, and said third pole-tip portion and are configured such that magnetic-flux density in said second portion of said gap lies substantially parallel to a plane of said magnetic-recording disk to erase recorded information from a portion of said magnetic-recording disk when said hard-disk drive is inserted into said second portion of said gap.

11. The bulk eraser of claim 10, wherein said first pole-tip portion, said second pole-tip portion, and said third pole-tip portion are configured such that said magnetic-flux density in said second portion of said gap lies in a substantially radial direction of said portion of said magnetic-recording disk in said hard-disk drive.

12. The bulk eraser of claim 10, wherein said first pole-tip portion, said second pole-tip portion, and said third pole-tip portion are configured to suppress magnetic-flux density in a third portion of said gap such that magnetization of said drive-motor magnet of said drive motor in said hard-disk drive is not degraded when located within said third portion.

13. The bulk eraser of claim 10, wherein said first pole-tip portion, said second pole-tip portion, and said third pole-tip portion are configured to confine said magnetic-flux density in said second portion of said gap to a region of said magnetic-recording disk sufficiently localized such that strength of eddy currents in said magnetic-recording disk are suppressed when rotating said magnetic-recording disk to erase recorded information on said magnetic-recording disk.

14. The bulk eraser of claim 10, wherein said first pole-tip portion is configured to direct magnetic flux emanating from said first pole-tip portion to said third pole-tip portion and to concentrate magnetic-flux density in said second portion of said gap substantially parallel to a plane of said magnetic-recording disk in said hard-disk drive in said second portion of said gap;
wherein said second pole-tip portion is configured to direct magnetic flux emanating from said second pole-tip portion to said third pole-tip portion and to concentrate magnetic-flux density in said second portion of said gap substantially parallel to a plane of said magnetic-recording disk in said hard-disk drive in said second portion of said gap; and
wherein said third pole-tip portion is configured to receive said magnetic flux emanating from said first pole-tip portion and said magnetic flux emanating from said second pole-tip portion and to concentrate magnetic-flux density in said second portion of said gap substantially parallel to a plane of said magnetic-recording disk in said hard-disk drive in said second portion of said gap.

15. The bulk eraser of claim 10, wherein said third pole-tip portion is configured to direct a first portion of magnetic flux emanating from said third pole-tip portion to said first pole-tip portion and to direct a second portion of magnetic flux emanating from said third pole-tip portion to said second pole-tip portion and to concentrate magnetic-flux density in said second portion of said gap substantially parallel to a plane of said magnetic-recording disk in said hard-disk drive in said second portion of said gap;
wherein said first pole-tip portion is configured to receive said first portion of magnetic flux emanating from said third pole-tip portion and to concentrate magnetic-flux density in said second portion of said gap substantially parallel to a plane of said magnetic-recording disk in said hard-disk drive in said second portion of said gap; and
wherein said second pole-tip portion is configured to receive said second portion of magnetic flux emanating from said third pole-tip portion and to concentrate magnetic-flux density in said second portion of said gap substantially parallel to a plane of said magnetic-recording disk in said hard-disk drive in said second portion of said gap.

16. The bulk eraser of claim 10, wherein at least one of said first source of magnetic flux and said second source of magnetic flux produces sufficient magnetic-flux density in said second portion of said gap to erase said magnetic-recording disk in said hard-disk drive.

17. The bulk eraser of claim 10, wherein at least one of said first source of magnetic flux and said second source of magnetic flux is an electromagnet.

18. The bulk eraser of claim 10, wherein at least one of said first source of magnetic flux and said second source of magnetic flux is a high-field-strength, permanent magnet.

19. The bulk eraser of claim 10, wherein said first source of magnetic flux is a first magnet composed of NdFeB material and said second source of magnetic flux is a second magnet composed of NdFeB material.

20. The bulk eraser of claim 19, wherein said NdFeB material has a grade between about grade 48 and about grade 54.

21. The bulk eraser of claim 19, wherein said NdFeB material has a grade of about grade 50.

22. The bulk eraser of claim 10, further comprising:
a yoke having a first yoke portion and a second yoke portion;

said first yoke portion magnetically coupled with said first source of magnetic flux and said third pole piece; and
said second yoke portion magnetically coupled with said second source of magnetic flux and said third pole piece;
wherein said yoke is configured to suppress stray magnetic flux and to increase magnetic-flux density in said second portion of said gap.

23. A hard-disk drive manufactured using a bulk eraser for erasing recorded information on a magnetic-recording disk in a hard-disk drive, said hard-disk drive comprising:
a magnetic-recording disk rotatably mounted on a spindle;
a head-gimbal assembly comprising:
said magnetic-recording head comprising;
a write element for writing recorded information to said magnetic-recording disk; and
said read element for reading recorded information from said magnetic-recording disk
a lead suspension attached to said magnetic-recording head; and
a load beam attached at a gimbal portion of said load beam to a slider including said magnetic-recording head; and
a drive motor having a drive-motor stator and a rotor, said rotor attached to said spindle for rotating said magnetic-recording disk;
a voice-coil motor comprising:
an armature including a voice-coil attached to said arm; and
a voice-coil-motor stator including a voice-coil magnet;
wherein said armature of said voice-coil motor is attached to said arm and is configured to move said head-arm assembly to access portions of said magnetic-recording disk; and
wherein recorded information on at least one magnetic-recording disk in a disk-stack of said hard-disk drive has been erased by a bulk eraser comprising:
a plurality of magnets comprising:
a first magnet at a top portion of an E-shaped structure;
a second magnet at a bottom portion of the E-shaped structure; and
a third magnet at a mid-portion of the E-shaped structure; and
a structure magnetically coupled with said plurality of magnets to produce magnetic-flux density in a gap, wherein said gap has a first portion, a second portion and a third portion and wherein two magnets are disposed with opposing polarity across said first portion of said gap;
wherein said plurality of magnets and said structure are configured to produce a magnetic-flux density in said second portion of said gap sufficient to erase recorded information from a portion of at least one magnetic-recording disk in a disk-stack of said hard-disk drive when said hard-disk drive is inserted into said second portion of said gap; and
wherein said plurality of magnets and said structure are configured to direct said magnetic-flux density in a substantially radial direction of said portion of said magnetic-recording disk in said hard-disk drive in said second portion of said gap.

24. The hard-disk drive of claim 23, wherein said recorded information is a first servo pattern on said magnetic-recording disk of said hard-disk drive, said first servo pattern erased by said bulk eraser to prepare said magnetic-recording disk to write a second servo pattern to replace said first servo pattern.

25. The hard-disk drive of claim 23, wherein said recorded information is recorded data on said magnetic-recording disk in said hard-disk drive, said recorded data erased by said bulk eraser to preserve security of said recorded data.

* * * * *